(12) United States Patent
Hui et al.

(10) Patent No.: US 12,505,463 B2
(45) Date of Patent: Dec. 23, 2025

(54) METHOD, SYSTEM, AND COMPUTER PROGRAM PRODUCT FOR IDENTIFYING PROPENSITIES USING MACHINE-LEARNING MODELS

(71) Applicant: Visa International Service Association, San Francisco, CA (US)

(72) Inventors: Vanessa Tay Jing Hui, Singapore (SG); Nguyen Thuy Ngoc, Ho Chi Minh (VN); Nguyen Thi Tu Anh, Ho Chi Minh (VN); Lubna Akhtar, Singapore (SG)

(73) Assignee: Visa International Service Association, San Francisco, CA (US)

( * ) Notice: Subject to any disclaimer, the term of this patent is extended or adjusted under 35 U.S.C. 154(b) by 156 days.

(21) Appl. No.: 18/426,861

(22) Filed: Jan. 30, 2024

(65) Prior Publication Data

US 2025/0245687 A1    Jul. 31, 2025

(51) Int. Cl.
   *G06Q 30/0204*    (2023.01)
(52) U.S. Cl.
   CPC ................ *G06Q 30/0204* (2013.01)
(58) Field of Classification Search
   None
   See application file for complete search history.

(56) References Cited

U.S. PATENT DOCUMENTS

| | | | |
|---|---|---|---|
| 12,287,821 B2* | 4/2025 | Lauber | G06F 16/355 |
| 2017/0228453 A1 | 8/2017 | Gupta et al. | |
| 2018/0095933 A1 | 4/2018 | Maruhashi | |
| 2019/0385012 A1 | 12/2019 | Ou et al. | |
| 2021/0374164 A1* | 12/2021 | Ghoula | G06F 16/285 |
| 2022/0027983 A1 | 1/2022 | Ben David et al. | |
| 2023/0129870 A1 | 4/2023 | Yang et al. | |
| 2023/0351431 A1* | 11/2023 | Sawicka | G06Q 30/0239 |

OTHER PUBLICATIONS

M. Al Khaldy, F. Aburub, N. Matar, M. I. Nofal, B. Sowan and M. Fasha, "Securing Digital Finance: Applying Machine Learning for Fraud Analysis, " 2024 2nd International Conference on Cyber Resilience (ICCR), Dubai, United Arab Emirates, 2024, pp. 1-7 (Year: 2024).*

* cited by examiner

*Primary Examiner* — Stephanie Z Delich
(74) *Attorney, Agent, or Firm* — The Webb Law Firm

(57) ABSTRACT

The method may include inputting a first set of data into a first model; for each user in the second group, generating a first similarity score; generating a relevance score for each parameter; determining a subset of parameters based on relevance; inputting the subset of parameters, a second set of data, and a third set of data into a second model; generating a space-partitioning data structure based on the second set of data; for each user in the first group, determining a feature distance between a representation of the user in the first group and a representation of a user in the second group based on the third set of data and the space-partitioning data structure; for each user in the second group, generating a second similarity score; and for each user in the second group, generating an overall similarity score.

20 Claims, 12 Drawing Sheets

| PAN NUMBER | SIMILARITY SCORE | SIMILARITY SEGMENT | ENGAGEMENT SCORE | ENGAGEMENT SEGMENT | TARGET PRIORITY |
|---|---|---|---|---|---|
| 1234XXXXXXXXXXX1 | 97 | HIGH | 34 | HIGH | VERY HIGH |
| 1234XXXXXXXXXXX2 | 83 | HIGH | 32 | HIGH | HIGH |
| 1234XXXXXXXXXXX3 | 61 | MEDIUM | 25 | MEDIUM | MEDIUM |
| 1234XXXXXXXXXXX4 | 23 | LOW | 12 | LOW | LOW |
| 1234XXXXXXXXXXX5 | 45 | MEDIUM | 34 | HIGH | MEDIUM |
| 1234XXXXXXXXXXX6 | 2 | LOW | 14 | LOW | VERY LOW |

FIG. 9

METHOD, SYSTEM, AND COMPUTER PROGRAM PRODUCT FOR IDENTIFYING PROPENSITIES USING MACHINE-LEARNING MODELS

BACKGROUND

1. Technical Field

This disclosure relates generally to identifying propensities and, in non-limiting embodiments or aspects, to systems, methods, and computer program products for identifying propensities using machine-learning models.

2. Technical Considerations

Machine-learning models can be used to analyze data and identify propensities therein, and thus generate predictions using the models. Several different categories of machine-learning models exist, such as supervised models and unsupervised models, and various specific types of models within these categories exist. Each category and type of machine-learning model may have its strengths and weaknesses.

SUMMARY

Accordingly, provided are improved methods, systems, and computer program products for identifying propensities using machine-learning models.

According to non-limiting embodiments or aspects, provided is a computer-implemented method including: inputting, with at least one processor, a first set of data into a first machine-learning model, the first set of data including first segment data associated with users of a first group, the first segment data labeled with a first identifier of the first group, and second segment data associated with users of a second group, the second segment data labeled with a second identifier of the second group, the first segment data and the second segment data including a plurality of parameters; for each user in the second group, generating, with at least one processor and based on the first machine-learning model, a first similarity score based on a similarity between the user in the second group and a representation of users in the first group based on the first segment data and the second segment data; generating, with at least one processor and based on the first machine-learning model, a relevance score for each parameter of the plurality of parameters based on the first segment data and the second segment data; determining, with at least one processor and based on the first machine-learning model, a subset of the plurality of parameters based on relevance to generating the first similarity scores; inputting, with at least one processor, the subset of the plurality of parameters, a second set of data, and a third set of data into a second machine-learning model, the second set of data including the subset of the plurality of parameters for the users of the second group, the third set of data including the subset of the plurality of parameters for the users of the first group; generating, with at least one processor and based on the second machine-learning model, a space-partitioning data structure representing each of the users of the second group based on the second set of data; for each user in the first group, determining, with at least one processor, at least one feature distance between a representation of the user in the first group and a representation of at least one user in the second group based on the third set of data and the space-partitioning data structure; for each user in the second group, generating with at least one processor and based on the second machine-learning model, a second similarity score representing the similarity between the user in the second group and a representation of users in the first group based on the at least one feature distance; and for each user in the second group, generating, with at least one processor, an overall similarity score representing the similarity between the user in the second group and a representation of users in the first group based on the first similarity score and the second similarity score.

In some non-limiting embodiments or aspects, the users in the first group may consist essentially of credit card users, and the users in the second group may consist essentially of debit card users.

In some non-limiting embodiments or aspects, the first machine-learning model may include an XGBoost classifier algorithm, and the second machine-learning model may include a K-D Tree algorithm.

In some non-limiting embodiments or aspects, the first machine-learning model may include a supervised machine-learning model, and the second machine-learning model may include an unsupervised machine-learning model.

In some non-limiting embodiments or aspects, generating the first similarity score may include the first machine-learning model: inputting a first subset of the first segment of data and second segment of data into a first decision tree of a plurality of decision trees, where the first decision tree may generate a first prediction; inputting a second subset of the first segment of data and second segment of data into a second decision tree of the plurality of decision trees, where the second decision tree may generate a second prediction; and generating the first similarity score based on the first prediction and the second prediction.

In some non-limiting embodiments or aspects, the computer-implemented method may include: determining, with at least one processor, a group including a plurality of users from the second group based on the overall similarity score of each of the users in the group satisfying a threshold; and in response to determining the group, automatically transmitting, with at least one processor, an offer message to a user device associated with each user in the group.

In some non-limiting embodiments or aspects, the first set of data, the second set of data, and the third set of data may include historical transaction data associated with electronic payment transactions conducted by users in the first and second groups.

In some non-limiting embodiments or aspects, the computer-implemented method may include: determining, with at least one processor, a group including a plurality of users from the second group based on the overall similarity score of each of the users in the group satisfying a threshold; for each user in the group, generating, with at least one processor, an engagement score based on historical transaction data associated with each user in the group; and automatically transmitting, with at least one processor, an offer message to a user device associated with each user in the group having an engagement score satisfying a threshold.

In some non-limiting embodiments or aspects, the computer-implemented method may include: for each user in the second group, generating, with at least one processor, an engagement score based on historical transaction data associated with each user in the second group, where the overall similarity score for each user in the second group may be generated based on the engagement score; the computer-implemented method may further include: determining, with at least one processor, a group including a plurality of users from the second group based on the overall similarity score of each of the users in the group satisfying a threshold; and in response to determining the group, automatically transmitting, with at least one processor, an offer message to a user device associated with each user in the group.

In some non-limiting embodiments or aspects, the historical transaction data associated with each user in the second group may include at least one of the following: a user spend value, a user spend frequency, a user spend consistency, a user spend diversity, or any combination thereof.

According to non-limiting embodiments or aspects, provided is a system including at least one processor configured to: input a first set of data into a first machine-learning model, the first set of data including first segment data associated with users of a first group, the first segment data labeled with a first identifier of the first group, and second segment data associated with users of a second group, the second segment data labeled with a second identifier of the second group, the first segment data and the second segment data including a plurality of parameters; for each user in the second group, generate, based on the first machine-learning model, a first similarity score based on a similarity between the user in the second group and a representation of users in the first group based on the first segment data and the second segment data; generate, based on the first machine-learning model, a relevance score for each parameter of the plurality of parameters based on the first segment data and the second segment data; determine, based on the first machine-learning model, a subset of the plurality of parameters based on relevance to generating the first similarity scores; input the subset of the plurality of parameters, a second set of data, and a third set of data into a second machine-learning model, the second set of data including the subset of the plurality of parameters for the users of the second group, the third set of data including the subset of the plurality of parameters for the users of the first group; generate, based on the second machine-learning model, a space-partitioning data structure representing each of the users of the second group based on the second set of data; for each user in the first group, determine at least one feature distance between a representation of the user in the first group and a representation of at least one user in the second group based on the third set of data and the space-partitioning data structure; for each user in the second group, generate, based on the second machine-learning model, a second similarity score representing the similarity between the user in the second group and a representation of users in the first group based on the at least one feature distance; and for each user in the second group, generate an overall similarity score representing the similarity between the user in the second group and a representation of users in the first group based on the first similarity score and the second similarity score.

In some non-limiting embodiments or aspects, the users in the first group may consist essentially of credit card users, and the users in the second group may consist essentially of debit card users.

In some non-limiting embodiments or aspects, the first machine-learning model may include an XGBoost classifier algorithm, and the second machine-learning model may include a K-D Tree algorithm.

In some non-limiting embodiments or aspects, the first machine-learning model may include a supervised machine-learning model, and the second machine-learning model may include an unsupervised machine-learning model.

In some non-limiting embodiments or aspects, generating the first similarity score may include the first machine-learning model: inputting a first subset of the first segment of data and second segment of data into a first decision tree of a plurality of decision trees, where the first decision tree may generate a first prediction; inputting a second subset of the first segment of data and second segment of data into a second decision tree of the plurality of decision trees, where the second decision tree may generate a second prediction; and generating the first similarity score based on the first prediction and the second prediction.

In some non-limiting embodiments or aspects, the at least one processor may be configured to: determine a group including a plurality of users from the second group based on the overall similarity score of each of the users in the group satisfying a threshold; and in response to determining the group, automatically transmit an offer message to a user device associated with each user in the group.

In some non-limiting embodiments or aspects, the first set of data, the second set of data, and the third set of data may include historical transaction data associated with electronic payment transactions conducted by users in the first and second groups.

In some non-limiting embodiments or aspects, the at least one processor may be configured to: determine a group including a plurality of users from the second group based on the overall similarity score of each of the users in the group satisfying a threshold; for each user in the group, generate an engagement score based on historical transaction data associated with each user in the group; and automatically transmit an offer message to a user device associated with each user in the group having an engagement score satisfying a threshold.

In some non-limiting embodiments or aspects, the at least one processor may be configured to: for each user in the second group, generate an engagement score based on historical transaction data associated with each user in the second group, where the overall similarity score for each user in the second group may be generated based on the engagement score; the at least one processor may be further configured to: determine a group including a plurality of users from the second group based on the overall similarity score of each of the users in the group satisfying a threshold; and in response to determining the group, automatically transmit an offer message to a user device associated with each user in the group.

In some non-limiting embodiments or aspects, the historical transaction data associated with each user in the second group may include at least one of the following: a user spend value, a user spend frequency, a user spend consistency, a user spend diversity, or any combination thereof.

According to non-limiting embodiments or aspects, provided is a computer program product including at least one non-transitory computer-readable medium including program instructions that, when executed by at least one processor, cause the at least one processor to: input a first set of data into a first machine-learning model, the first set of data including first segment data associated with users of a first group, the first segment data labeled with a first identifier of the first group, and second segment data associated with users of a second group, the second segment data labeled with a second identifier of the second group, the first segment data and the second segment data including a plurality of parameters; for each user in the second group, generate, based on the first machine-learning model, a first similarity score based on a similarity between the user in the second group and a representation of users in the first group based on the first segment data and the second segment data; generate, based on the first machine-learning model, a relevance score for each parameter of the plurality of parameters based on the first segment data and the second segment data; determine, based on the first machine-learning model, a subset of the plurality of parameters based on relevance to generating the first similarity scores; input the subset of the plurality of parameters, a second set of data, and a third set of data into a second machine-learning model, the second set of data including the subset of the plurality of parameters for the users of the second group, the third set of data including the subset of the plurality of parameters for the users of the first group; generate, based on the second machine-learning model, a space-partitioning data structure representing each of the users of the second group based on the second set of data; for each user in the first group, determine at least one feature distance between a representation of the user in the first group and a representation of at least one user in the second group based on the third set of data and the space-partitioning data structure; for each user in the second group, generate, based on the second machine-learning model, a second similarity score representing the similarity between the user in the second group and a representation of users in the first group based on the at least one feature distance; and for each user in the second group, generate an overall similarity score representing the similarity between the user in the second group and a representation of users in the first group based on the first similarity score and the second similarity score.

In some non-limiting embodiments or aspects, the users in the first group may consist essentially of credit card users, and the users in the second group may consist essentially of debit card users.

In some non-limiting embodiments or aspects, the first machine-learning model may include an XGBoost classifier algorithm, and the second machine-learning model may include a K-D Tree algorithm.

In some non-limiting embodiments or aspects, the first machine-learning model may include a supervised machine-learning model, and the second machine-learning model may include an unsupervised machine-learning model.

In some non-limiting embodiments or aspects, generating the first similarity score may include the first machine-learning model: inputting a first subset of the first segment of data and second segment of data into a first decision tree of a plurality of decision trees, where the first decision tree may generate a first prediction; inputting a second subset of the first segment of data and second segment of data into a second decision tree of the plurality of decision trees, where the second decision tree may generate a second prediction; and generating the first similarity score based on the first prediction and the second prediction.

In some non-limiting embodiments or aspects, the program instructions may cause the at least one processor to: determine a group including a plurality of users from the second group based on the overall similarity score of each of the users in the group satisfying a threshold; and in response to determining the group, automatically transmit an offer message to a user device associated with each user in the group.

In some non-limiting embodiments or aspects, the first set of data, the second set of data, and the third set of data may include historical transaction data associated with electronic payment transactions conducted by users in the first and second groups.

In some non-limiting embodiments or aspects, the program instructions may cause the at least one processor to: determine a group including a plurality of users from the second group based on the overall similarity score of each of the users in the group satisfying a threshold; for each user in the group, generate an engagement score based on historical transaction data associated with each user in the group; and automatically transmit an offer message to a user device associated with each user in the group having an engagement score satisfying a threshold.

In some non-limiting embodiments or aspects, the program instructions may cause the at least one processor to: for each user in the second group, generate an engagement score based on historical transaction data associated with each user in the second group, where the overall similarity score for each user in the second group may be generated based on the engagement score; where the program instructions may further cause the at least one processor to: determine a group including a plurality of users from the second group based on the overall similarity score of each of the users in the group satisfying a threshold; and in response to determining the group, automatically transmit an offer message to a user device associated with each user in the group.

In some non-limiting embodiments or aspects, the historical transaction data associated with each user in the second group may include at least one of the following: a user spend value, a user spend frequency, a user spend consistency, a user spend diversity, or any combination thereof.

Further non-limiting embodiments or aspects are set forth in the following numbered clauses:

Clause 1: A computer-implemented method comprising: inputting, with at least one processor, a first set of data into a first machine-learning model, the first set of data comprising first segment data associated with users of a first group, the first segment data labeled with a first identifier of the first group, and second segment data associated with users of a second group, the second segment data labeled with a second identifier of the second group, the first segment data and the second segment data comprising a plurality of parameters; for each user in the second group, generating, with at least one processor and based on the first machine-learning model, a first similarity score based on a similarity between the user in the second group and a representation of users in the first group based on the first segment data and the second segment data; generating, with at least one processor and based on the first machine-learning model, a relevance score for each parameter of the plurality of parameters based on the first segment data and the second segment data; determining, with at least one processor and based on the first machine-learning model, a subset of the plurality of parameters based on relevance to generating the first similarity scores; inputting, with at least one processor, the subset of the plurality of parameters, a second set of data, and a third set of data into a second machine-learning model, the second set of data comprising the subset of the plurality of parameters for the users of the second group, the third set of data comprising the subset of the plurality of parameters for the users of the first group; generating, with at least one processor and based on the second machine-learning model, a space-partitioning data structure representing each of the users of the second group based on the second set of data; for each user in the first group, determining, with at least one processor, at least one feature distance between a representation of the user in the first group and a representation of at least one user in the second group based on the third set of data and the space-partitioning data structure; for each user in the second group, generating, with at least one processor and based on the second machine-learning model, a second similarity score representing the similarity between the user in the second group and a representation of users in the first group based on the at least one feature distance; and for each user in the second group, generating, with at least one processor, an overall similarity score representing the similarity between the user in the second group and a representation of users in the first group based on the first similarity score and the second similarity score.

Clause 2: The computer-implemented method of clause 1, wherein the users in the first group consist essentially of credit card users, and the users in the second group consist essentially of debit card users.

Clause 3: The computer-implemented method of clause 1 or 2, wherein the first machine-learning model comprises an XGBoost classifier algorithm, and the second machine-learning model comprises a K-D Tree algorithm.

Clause 4: The computer-implemented method of any of clauses 1-3, wherein the first machine-learning model comprises a supervised machine-learning model, and the second machine-learning model comprises an unsupervised machine-learning model.

Clause 5: The computer-implemented method of any of clauses 1-4, wherein generating the first similarity score comprises the first machine-learning model: inputting a first subset of the first segment of data and second segment of data into a first decision tree of a plurality of decision trees, wherein the first decision tree generates a first prediction; inputting a second subset of the first segment of data and second segment of data into a second decision tree of the plurality of decision trees, wherein the second decision tree generates a second prediction; and generating the first similarity score based on the first prediction and the second prediction.

Clause 6: The computer-implemented method of any of clauses 1-5, further comprising: determining, with at least one processor, a group comprising a plurality of users from the second group based on the overall similarity score of each of the users in the group satisfying a threshold; and in response to determining the group, automatically transmitting, with at least one processor, an offer message to a user device associated with each user in the group.

Clause 7: The computer-implemented method of any of clauses 1-6, wherein the first set of data, the second set of data, and the third set of data comprise historical transaction data associated with electronic payment transactions conducted by users in the first and second groups.

Clause 8: The computer-implemented method of any of clauses 1-7, further comprising: determining, with at least one processor, a group comprising a plurality of users from the second group based on the overall similarity score of each of the users in the group satisfying a threshold; for each user in the group, generating, with at least one processor, an engagement score based on historical transaction data associated with each user in the group; and automatically transmitting, with at least one processor, an offer message to a user device associated with each user in the group having an engagement score satisfying a threshold.

Clause 9: The computer-implemented method of any of clauses 1-8, further comprising: for each user in the second group, generating, with at least one processor, an engagement score based on historical transaction data associated with each user in the second group, wherein the overall similarity score for each user in the second group is generated based on the engagement score; the computer-implemented method further comprising: determining, with at least one processor, a group comprising a plurality of users from the second group based on the overall similarity score of each of the users in the group satisfying a threshold; and in response to determining the group, automatically transmitting, with at least one processor, an offer message to a user device associated with each user in the group.

Clause 10: The computer-implemented method of any of clauses 1-9, wherein the historical transaction data associated with each user in the second group comprises at least one of the following: a user spend value, a user spend frequency, a user spend consistency, a user spend diversity, or any combination thereof.

Clause 11: A system comprising at least one processor configured to: input a first set of data into a first machine-learning model, the first set of data comprising first segment data associated with users of a first group, the first segment data labeled with a first identifier of the first group, and second segment data associated with users of a second group, the second segment data labeled with a second identifier of the second group, the first segment data and the second segment data comprising a plurality of parameters; for each user in the second group, generate, based on the first machine-learning model, a first similarity score based on a similarity between the user in the second group and a representation of users in the first group based on the first segment data and the second segment data; generate, based on the first machine-learning model, a relevance score for each parameter of the plurality of parameters based on the first segment data and the second segment data; determine, based on the first machine-learning model, a subset of the plurality of parameters based on relevance to generating the first similarity scores; input the subset of the plurality of parameters, a second set of data, and a third set of data into a second machine-learning model, the second set of data comprising the subset of the plurality of parameters for the users of the second group, the third set of data comprising the subset of the plurality of parameters for the users of the first group; generate, based on the second machine-learning model, a space-partitioning data structure representing each of the users of the second group based on the second set of data; for each user in the first group, determine at least one feature distance between a representation of the user in the first group and a representation of at least one user in the second group based on the third set of data and the space-partitioning data structure; for each user in the second group, generate, based on the second machine-learning model, a second similarity score representing the similarity between the user in the second group and a representation of users in the first group based on the at least one feature distance; and for each user in the second group, generate an overall similarity score representing the similarity between the user in the second group and a representation of users in the first group based on the first similarity score and the second similarity score.

Clause 12: The system clause 11, wherein the users in the first group consist essentially of credit card users, and the users in the second group consist essentially of debit card users.

Clause 13: The system of clause 11 or 12, wherein the first machine-learning model comprises an XGBoost classifier algorithm, and the second machine-learning model comprises a K-D Tree algorithm.

Clause 14: The system of any of clauses 11-13, wherein the first machine-learning model comprises a supervised machine-learning model, and the second machine-learning model comprises an unsupervised machine-learning model.

Clause 15: The system of any of clauses 11-14, wherein generating the first similarity score comprises the first machine-learning model: inputting a first subset of the first segment of data and second segment of data into a first decision tree of a plurality of decision trees, wherein the first decision tree generates a first prediction; inputting a second subset of the first segment of data and second segment of data into a second decision tree of the plurality of decision trees, wherein the second decision tree generates a second prediction; and generating the first similarity score based on the first prediction and the second prediction.

Clause 16: The system of any of clauses 11-15, the at least one processor configured to: determine a group comprising a plurality of users from the second group based on the overall similarity score of each of the users in the group satisfying a threshold; and in response to determining the group, automatically transmit an offer message to a user device associated with each user in the group.

Clause 17: The system of any of clauses 11-16, wherein the first set of data, the second set of data, and the third set of data comprise historical transaction data associated with electronic payment transactions conducted by users in the first and second groups.

Clause 18: The system of any of clauses 11-17, the at least one processor configured to: determine a group comprising a plurality of users from the second group based on the overall similarity score of each of the users in the group satisfying a threshold; for each user in the group, generate an engagement score based on historical transaction data associated with each user in the group; and automatically transmit an offer message to a user device associated with each user in the group having an engagement score satisfying a threshold.

Clause 19: The system of any of clauses 11-18, the at least one processor configured to: for each user in the second group, generate an engagement score based on historical transaction data associated with each user in the second group, wherein the overall similarity score for each user in the second group is generated based on the engagement score; the at least one processor further configured to: determine a group comprising a plurality of users from the second group based on the overall similarity score of each of the users in the group satisfying a threshold; and in response to determining the group, automatically transmit an offer message to a user device associated with each user in the group.

Clause 20: The system of any of clauses 11-19, wherein the historical transaction data associated with each user in the second group comprises at least one of the following: a user spend value, a user spend frequency, a user spend consistency, a user spend diversity, or any combination thereof.

Clause 21: A computer program product, comprising at least one non-transitory computer-readable medium including program instructions that, when executed by at least one processor, cause the at least one processor to: input a first set of data into a first machine-learning model, the first set of data comprising first segment data associated with users of a first group, the first segment data labeled with a first identifier of the first group, and second segment data associated with users of a second group, the second segment data labeled with a second identifier of the second group, the first segment data and the second segment data comprising a plurality of parameters; for each user in the second group, generate, based on the first machine-learning model, a first similarity score based on a similarity between the user in the second group and a representation of users in the first group based on the first segment data and the second segment data; generate, based on the first machine-learning model, a relevance score for each parameter of the plurality of parameters based on the first segment data and the second segment data; determine, based on the first machine-learning model, a subset of the plurality of parameters based on relevance to generating the first similarity scores; input the subset of the plurality of parameters, a second set of data, and a third set of data into a second machine-learning model, the second set of data comprising the subset of the plurality of parameters for the users of the second group, the third set of data comprising the subset of the plurality of parameters for the users of the first group; generate, based on the second machine-learning model, a space-partitioning data structure representing each of the users of the second group based on the second set of data; for each user in the first group, determine at least one feature distance between a representation of the user in the first group and a representation of at least one user in the second group based on the third set of data and the space-partitioning data structure; for each user in the second group, generate, based on the second machine-learning model, a second similarity score representing the similarity between the user in the second group and a representation of users in the first group based on the at least one feature distance; and for each user in the second group, generate an overall similarity score representing the similarity between the user in the second group and a representation of users in the first group based on the first similarity score and the second similarity score.

Clause 22: The computer program product clause 21, wherein the users in the first group consist essentially of credit card users, and the users in the second group consist essentially of debit card users.

Clause 23: The computer program product of clause 21 or 22, wherein the first machine-learning model comprises an XGBoost classifier algorithm, and the second machine-learning model comprises a K-D Tree algorithm.

Clause 24: The computer program product of any of clauses 21-23, wherein the first machine-learning model comprises a supervised machine-learning model, and the second machine-learning model comprises an unsupervised machine-learning model.

Clause 25: The computer program product of any of clauses 21-24, wherein generating the first similarity score comprises the first machine-learning model: inputting a first subset of the first segment of data and second segment of data into a first decision tree of a plurality of decision trees, wherein the first decision tree generates a first prediction; inputting a second subset of the first segment of data and second segment of data into a second decision tree of the plurality of decision trees, wherein the second decision tree generates a second prediction; and generating the first similarity score based on the first prediction and the second prediction.

Clause 26: The computer program product of any of clauses 21-25, wherein the program instructions cause the at least one processor to: determine a group comprising a plurality of users from the second group based on the overall similarity score of each of the users in the group satisfying a threshold; and in response to determining the group, automatically transmit an offer message to a user device associated with each user in the group.

Clause 27: The computer program product of any of clauses 21-26, wherein the first set of data, the second set of data, and the third set of data comprise historical transaction data associated with electronic payment transactions conducted by users in the first and second groups.

Clause 28: The computer program product of any of clauses 21-27, wherein the program instructions cause the at least one processor to: determine a group comprising a plurality of users from the second group based on the overall similarity score of each of the users in the group satisfying a threshold; for each user in the group, generate an engagement score based on historical transaction data associated with each user in the group; and automatically transmit an offer message to a user device associated with each user in the group having an engagement score satisfying a threshold.

Clause 29: The computer program product of any of clauses 21-28, wherein the program instructions cause the at least one processor to: for each user in the second group, generate an engagement score based on historical transaction data associated with each user in the second group, wherein the overall similarity score for each user in the second group is generated based on the engagement score; wherein the program instructions further cause the at least one processor to: determine a group comprising a plurality of users from the second group based on the overall similarity score of each of the users in the group satisfying a threshold; and in response to determining the group, automatically transmit an offer message to a user device associated with each user in the group.

Clause 30: The computer program product of any of clauses 21-29, wherein the historical transaction data associated with each user in the second group comprises at least one of the following: a user spend value, a user spend frequency, a user spend consistency, a user spend diversity, or any combination thereof.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which:

FIGS. 8 and 9 are schematic diagrams for cross-analyzing similarity and engagement segments, according to some non-limiting embodiments or aspects;

DETAILED DESCRIPTION

Figure 1:
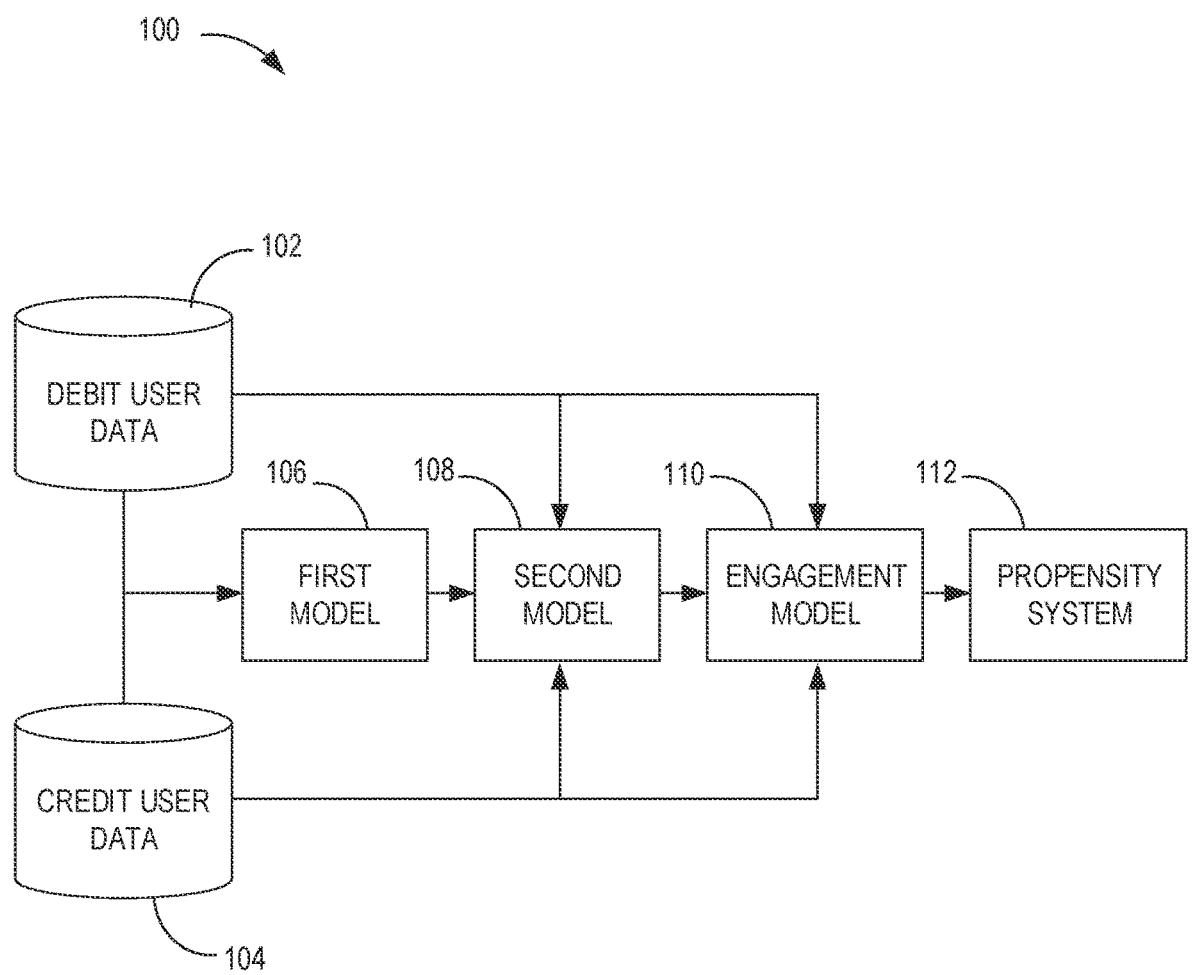
FIG. 1 is a schematic diagram of a system for identifying propensities using machine-learning models, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alpha-numeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning s (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers configured to process online payment transactions through webpages, mobile applications, and/or the like.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to methods, systems, and computer program products for identifying propensities using machine-learning models. Non-limiting embodiments or aspects include an ordered combination of at least two machine-learning models to identify propensities, the ordered combination of the at least two machine-learning models constitute an unconventional arrangement of components in a system for identifying propensities. The use of this ordered combination of machine-learning models results in a system with enhanced accuracy in its propensity identification, and the system also optimizes the processing resources expended by the system in identifying propensities.

Non-limiting embodiments or aspects include a first machine-learning model to which is input a data set including first segment data of labeled data associated with users of a first group and second segment data of labeled data associated with users of a second group. The first model may generate a first similarity score based on a similarity between the user in the second group and a representation of users in the first group based on the first segment data and the second segment data. The first model may also generate a relevance score for each parameter of the plurality of parameters based on the first segment data and the second segment data and determine a subset of the plurality of parameters based on relevance to generating the first similarity scores. This subset of parameters may be input to a second machine-learning model, and the second model may analyze data associated with the subset of parameters. Thus, the first model and the second model may co-act in a system that generates an overall similarity score using both models. The first model inputting the subset of parameters to the second model may conserve the processing resources expended by the system such as expended by the second model. The subset of parameters includes a smaller group of parameters (e.g., the parameters determined most relevant by the first model) compared to the plurality of parameters, such that the second model can forgo analyzing data associated with the parameters not contained in the subset. By forgoing analyzing certain parameters determined less relevant by the first model, the second model may expend fewer processing resources in generating its output. Moreover, in some non-limiting examples, the second model may be an unsupervised model, and narrowing the parameters to the subset by the first model may enable the second model to analyze the data within the predetermined time period. Thus, the interaction of the at least two models improves the system in both the accuracy of its outputs and its expenditure of computing resources. This may be achieved by using the supervised model to generate a subset of the most relevant data parameters and providing that more manageable subset of the parameters to the unsupervised model to identify for the unsupervised model the most relevant features to use and improve its accuracy and processing efficiency.

Non-limiting embodiments or aspects utilize a supervised first model and an unsupervised second model in order to enhance the system by realizing the benefits of each category of model while minimizing the drawbacks of each. Unsupervised machine-learning models can have lower performance and be more difficult to evaluate compared to supervised machine-learning models, such that incorporating a supervised machine-learning model in combination with the unsupervised machine-learning model can boost the performance and efficiency of the system.

Non-limiting embodiments or aspects of the second model generate a space-partitioning data structure representing each of the users of the second group based on the second set of data and determine at least one feature distance between a representation of the user in the first group and a representation of at least one user in the second group based on the third set of data and the space-partitioning data structure in order to generate the second similarity score. Non-limiting embodiments or aspects of the first model input a first subset of the first segment of data and second segment of data into a first decision tree of a plurality of decision trees to generate a first prediction and input a second subset of the first segment of data and second segment of data into a second decision tree of the plurality of decision trees to generate a second prediction and generate the first similarity score based on the first and second predictions.

Non-limiting embodiments or aspects generate an engagement score for users based on historical transaction data associated with each user in the second group. The historical transaction data may comprise data associated with electronic payment transactions conducted by the users. The engagement score may be used in combination with the first and second similarity scores generated by the first and second models to determine a subset of users of a plurality of users, which combination improves the accuracy of the output (e.g., predictions) of the system. Non-limiting embodiments or aspects automatically determine a subset of users of a plurality of users and automatically transmit an offer message to a user device associated with each user in the subset.

Referring to FIG. 1, a system 100 is shown for identifying propensities using machine-learning models, according to some non-limiting embodiments or aspects. The system 100 may include at least one of a debit user data database 102, a credit user data database 104, a first machine-learning model 106 (hereinafter first model), a second machine-learning model 108 (hereinafter second model), an engagement model 110, and/or a propensity system 112.

Debit user data database 102 may store historical transaction data associated with transactions conducted by debit card users (e.g., account holders) over a payment network. A user may be determined to be a debit account holder based on the user holding an account having an identifier (e.g., tag, metadata, and/or the like) identifying the account as a debit account. The payment network may include at least one of a merchant system, an acquirer system, a transaction processing system, and/or an issuer system processing electronic payment transactions. The debit user data database 102 may store historical transaction data associated with transactions conducted by a plurality of debit card users. The debit user data database 102 and/or the group of debit card users analyzed by the system 100 may consist essentially of or consist of historical transaction data associated with transactions initiated using debit cards. Consisting essentially of in this context may mean that the debit user data database 102 does not include more than 20% of non-debit user transaction data, such as not more than 10%, not more than 5%, not more than 1%, or 0%. The debit user data database 102 may not include historical transaction data associated with transactions initiated using credit cards. The historical transaction data stored in the debit user data database 102 may comprise a plurality of parameters and may comprise any parameters associated with conducting electronic payment transactions. For example, the plurality of parameters may comprise any of the data elements specified in ISO 8583, as well as any additional or composite data elements related to the electronic payment transactions. The debit user data database 102 may be in communication with at least one of the first model 106, the second model 108, and the engagement model 110. In some non-limiting embodiments or aspects, the debit user data database 102 may not contain debit card application data from the issuer system that issued the debit card.

Credit user data database 104 may store historical transaction data associated with transactions conducted by credit card users over a payment network. The credit user data database 104 may store historical transaction data associated with transactions conducted by a plurality of credit card users (e.g., account holders). A user may be determined to be a credit account holder based on the user holding an account having an identifier (e.g., tag, metadata, and/or the like) identifying the account as a credit account. The credit user data database 104 and/or the group of debit card users analyzed by the system 100 may consist essentially of or consist of historical transaction data associated with transactions initiated using credit cards. Consisting essentially of in this context may mean that the credit user data database 104 does not include more than 20% of non-credit user transaction data, such as not more than 10%, not more than 5%, not more than 1%, or 0%. The credit user data database 104 may not include historical transaction data associated with transactions initiated using debit cards. The historical transaction data stored in the credit user data database 104 may comprise a plurality of parameters and may comprise any parameters associated with conducting electronic payment transactions. For example, the plurality of parameters may comprise any of the data elements specified in ISO 8583, as well as any additional or composite data elements related to the electronic payment transactions. The credit user data database 104 may be in communication with at least one of the first model 106, the second model 108, and the engagement model 110.

The historical transaction data stored in the debit and credit user data databases 102, 104 may include any data related to an electronic payment transaction. Non-limiting examples of historical transaction data include: transaction date/time, transaction amount, merchant identifier, merchant category code, product/service identifier, transaction type (e.g., cash, sales, card on file, token, etc.), payment device type (e.g., debit, credit, etc.), transaction channels (e.g., card present, card not present, domestic, cross-border, etc.), market segment (e.g., apparel and accessories, fuel, electronics, telecommunication and utilities, etc.), market segment or merchant category code counts, number of months active, and the like.

The system 100 may identify the propensity of debit card users to begin using a credit card. The debit card users analyzed by the system 100 may be users who do not hold any credit accounts. The debit card users analyzed by the system 100 may be users who do not hold any credit account issued by an issuer system for whom the system 100 is analyzing the debit card user (even if the users hold a credit account issued by a different issuer). The system 100 may use a plurality of machine-learning models as described herein to determine the propensity of the debit card users.

The first model 106 may comprise a machine-learning model configured to analyze data and generate predictions. In some non-limiting embodiments or aspects, the first model 106 may comprise a supervised machine-learning model. By "supervised" it is meant that the first model 106 uses labeled datasets to train algorithms that generate classifications and/or predictions. The supervised model may adjust weights of the algorithm as data is fed to the model, and the labels may be used by the supervised model in a cross validation process. In some non-limiting embodiments or aspects, the first model 106 may comprise an XGBoost classifier algorithm. The first model 106 may be in communication with at least one of the debit user data database 102, the credit user data database 104, the second model 108, the engagement model 110, and/or the propensity system 112.

The second model 108 may comprise a machine-learning model configured to analyze data and generate predictions. In some non-limiting embodiments or aspects, the second model 108 may comprise an unsupervised machine-learning model. By "unsupervised" it is meant that the second model 108 uses unlabeled datasets and discovers patterns therefrom to generate an algorithm that generates classifications and/or predictions. In some non-limiting embodiments or aspects, the data input to the second model 108 may be labeled, but the labels may not be used by the second model 108 to generate decisions. For example, the second model 108 may use feature (e.g., Euclidean) distances and not labels to generate its decisions. In some non-limiting embodiments or aspects, the second model 108 may comprise a K-D Tree algorithm. The second model 108 may be in communication with at least one of the debit user data database 102, the credit user data database 104, the first model 106, the engagement model 110, and/or the propensity system 112.

In some non-limiting embodiments or aspects, the first model 106 may comprise a supervised model and the second model 108 may comprise an unsupervised model, such that the system 100 uses a combination of a supervised model and an unsupervised model. In some non-limiting embodiments or aspects, the first model 106 may comprise an XGBoost classifier algorithm and the second model 108 may comprise a K-D Tree algorithm. In some non-limiting embodiments or aspects, an output of the first model 106 may be an input to the second model 108.

The engagement model 110 may comprise at least one algorithm to generate engagement scores for users. The engagement scores may be generated for all of the debit card users or a subset thereof. The engagement scores may be generated as described hereinafter. The engagement model 110 may comprise a rule-based system and/or a machine-learning model. The engagement model 110 may be in communication with at least one of the debit user data database 102, the credit user data database 104, the first model 106, the second model 108, and/or the propensity system 112.

The propensity system 112 may comprise one or more computing devices configured to process data. The propensity system 112 may be in communication with at least one of the debit user data database 102, the credit user data database 104, the first model 106, the second model 108, and/or the propensity system 112. For example, the propensity system 112 may receive the first similarity score from the first model 106, the second similarity score from the second model 108, and/or the engagement score from the engagement model 110, and the propensity system 112 may generate at least one overall similarity score based on at least one of the first similarity score, the second similarity score, the engagement score, or any combination thereof. The overall similarity scores may be generated as described hereinafter.

Figure 2:
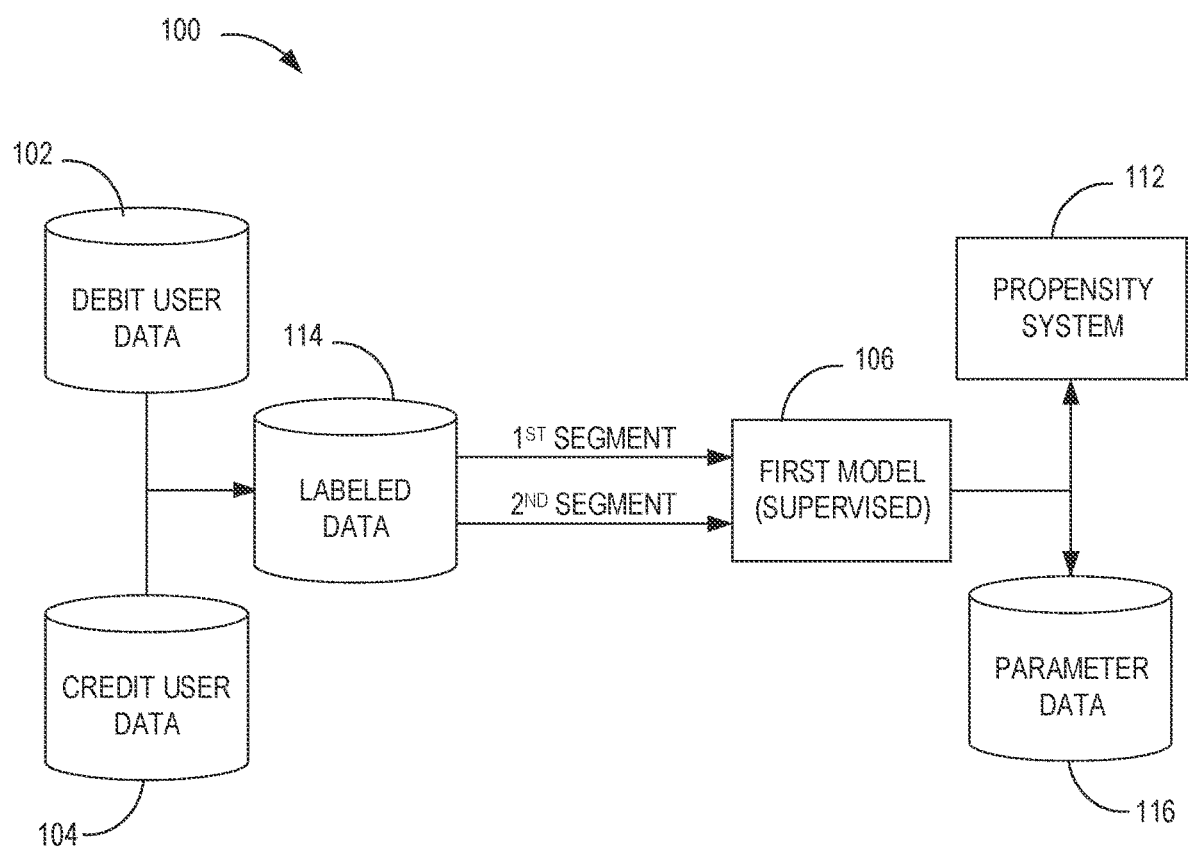
FIG. 2 is a schematic diagram of a system for identifying propensities using a first (supervised) machine-learning model, according to some non-limiting embodiments or aspects.

Referring to FIG. 2, a system 100 is shown for identifying propensities using the first model 106. The first model 106 may be a supervised machine-learning model. The debit user data database 102 and the credit user data database 104 may be inputs to the first model 106. In some non-limiting embodiments or aspects, data from the debit user data database 102 and the credit user data database 104 may be combined (e.g., in labeled data database 114). Labeled data database 114 may store labeled data derived from the data stored in the debit user data database 102 and the credit user data database 104. The data stored in the debit user data database 102 and the credit user data database 104 may be labeled, or the data from the debit user data database 102 and the credit user data database 104 may be labeled after being communicated therefrom (such as being labeled by the labeled data database 114).

Data from the debit user data database 102 may be labeled with a first identifier such that the data is labeled as associated with an electronic payment transaction associated with a transaction initiated with a debit card by a debit card user. Data from the credit user data database 104 may be labeled with a second identifier such that the data is labeled as associated with an electronic payment transaction associated with a transaction initiated with a credit card by a credit card user.

The labeled data from the labeled data database 114 may be input to the first model 106. The labeled data input to the first model 106 may comprise a first segment of data from the labeled data database 114, the first segment comprising data labeled with the first identifier (labeled as debit card data). The labeled data input to the first model 106 may comprise a second segment of data from the labeled data database 114, the second segment comprising data labeled with the second identifier (labeled as credit card data). The labeled data may comprise the data label and a plurality of parameters associated with each electronic payment transaction.

With continued reference to FIG. 2, in some non-limiting embodiments or aspects, the first model 106 (and/or the propensity system 112) may generate a first similarity score for each debit card user. The first similarity score may be based on a similarity between the debit card user for whom the score is being generated and a representation of the credit card users based on the first segment data and the second segment data input to the first model 106. The representation of the credit card users may be any suitable representation, such as a specific credit card user, a statistical representation of all of the credit card users, a statistical representation of some subset of the credit card users, and the like. Thus, the first similarity score may represent a similarity between a specific debit card user and the representation of the credit card users, representing the propensity of the debit card user for becoming a new credit card user according to the first model 106. The first similarity score may be in any suitable form for representing the propensity of the debit card user becoming a new credit card user, such as a numeric score, an alphabetic grade, a binary return (e.g., likely, not likely), a categorization (e.g., high, medium, low propensity), and the like.

In some non-limiting embodiments or aspects, the first model 106 may generate the first similarity score and transmit the first similarity score to the propensity system 112. In some non-limiting embodiments or aspects, the output of the first model 106 may be transmitted to the propensity system 112 which may generate the first similarity score.

Figure 3:
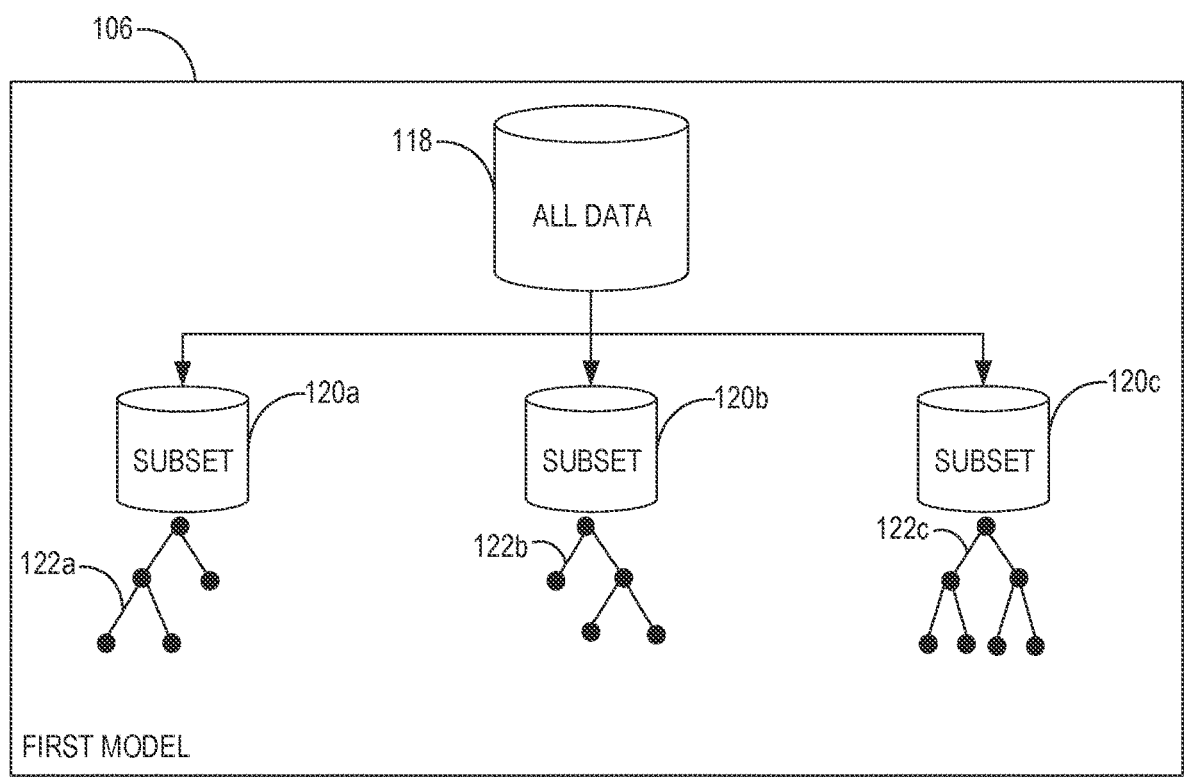
FIG. 3 is a schematic diagram of a first (supervised) machine-learning model, according to some non-limiting embodiments or aspects.

Referring to FIG. 3, the first model 106 is shown according to some non-limiting embodiments or aspects. The first model 106 may generate the first similarity score as follows. The first model 106 may comprise an all data database 118 comprising all data input to the first model 106 (e.g., the labeled data). The first model 106 may comprise a plurality of subset databases 120a-c comprising a subset of the data contained in the all data database 118. The non-limiting example in FIG. 3 shows 3 subset databases 120a-c, but it will be appreciated that more or fewer such databases may be included in the first model 106. The data in the all data database 118 may evenly or unevenly be divided among the subset databases 120a-c. In some non-limiting embodiments or aspects, the same data entry in the all data database 118 may be contained in only one of the subset databases 120a-c such that there is not overlapping data in the subset databases 120a-c. In some non-limiting embodiments or aspects, the same data entry in the all data database 118 may be contained in multiple of the subset databases 120a-c such that there is overlapping data in the subset databases 120a-c. Data from the all data database 118 may be randomly assigned to one or more subset database 120a-c, or the distribution of data from the all data database 118 may be assigned to one or more subset database 120a-c in any other manner. Each subset database 120a-c may be used to generate a separate decision tree 122a-c.

To generate the first similarity score, the first model 106 may input a first subset of the first segment of data and second segment (e.g., stored in the first subset database 120a) of data into a first decision tree 122a of a plurality of decision trees, and the first decision tree 122a may generate a first prediction. The first model 106 may input a second subset of the first segment of data and second segment (e.g., stored in the second subset database 120b) of data into a second decision tree 122b of a plurality of decision trees, and the second decision tree 122b may generate a second prediction. The first model 106 (and/or the propensity system 112) may generate the first similarity score based on the first and second prediction. The first and second prediction (and any other predictions from other decision trees) may be combined in any suitable manner to generate the first similarity score. The first model 106 generating the first similarity score in this manner may comprise an XGBoost classifier algorithm.

Figure 4:
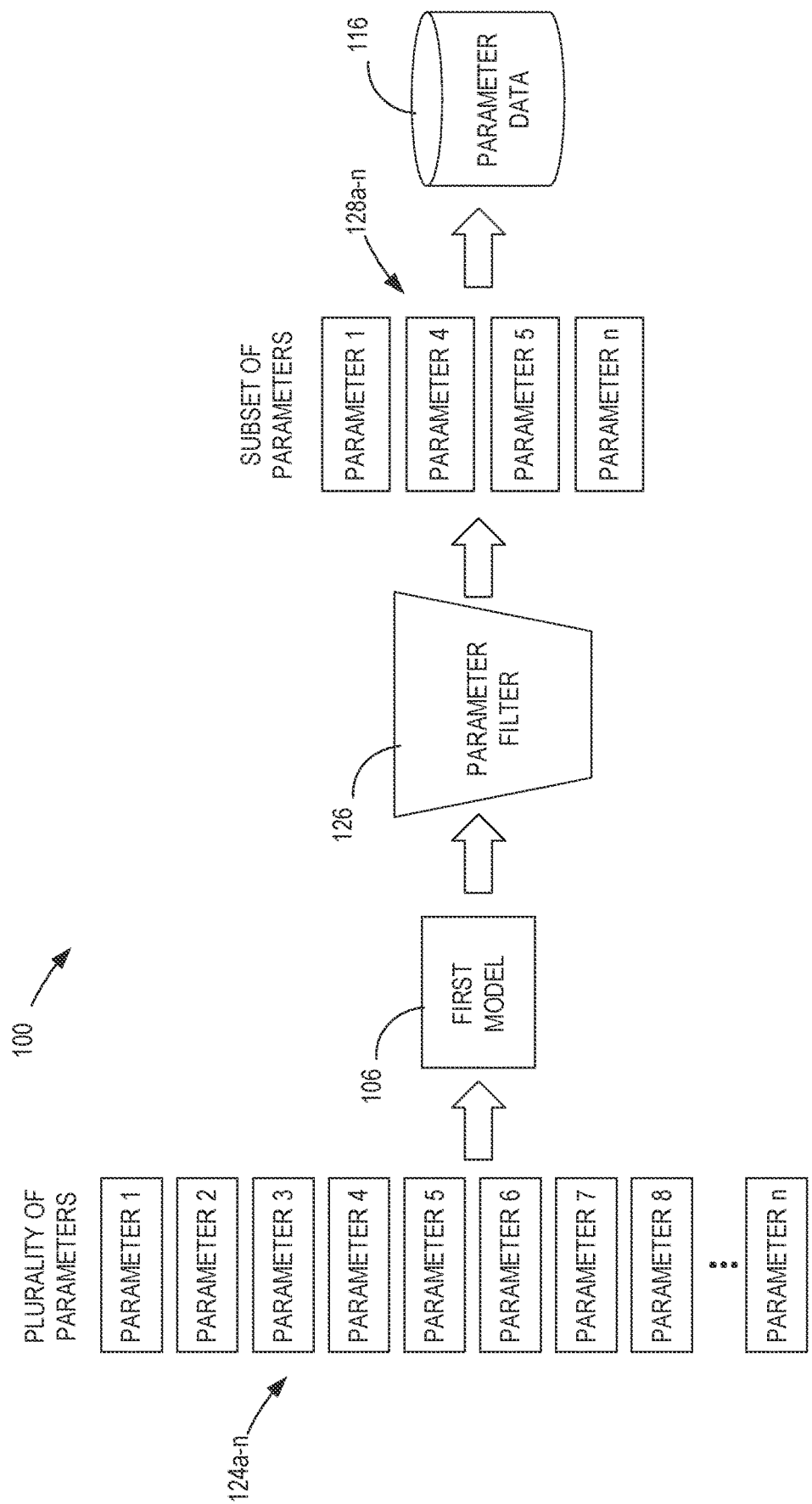
FIG. 4 is a schematic diagram of a first machine-learning model generating a subset of parameters for use by a second machine-learning model, according to some non-limiting embodiments or aspects.

Referring to FIG. 4, the first model 106 generating a subset of parameters for use by the second model 108 (see e.g., FIG. 1) is shown according to some non-limiting embodiments or aspects. As previously described, the data input to the first model 106 may comprise a plurality of parameters 124a-n associated with electronic payment transactions conducted by users. The first model 106 may generate a relevance score for each of the plurality of parameters 124a-n based on the first segment data and the second segment data. The relevance score may represent the first model's 106 determination of each of the plurality of parameters' 124a-n relevance to generating the first similarity scores (e.g., how much each parameter influences the first similarity scores generated by the first model 106). The relevance score may be in any suitable form for representing the relevance of the parameter to generating the first similarity score, such as a numeric score, an alphabetic grade, a binary return (e.g., relevant, not relevant), a categorization (e.g., high, medium, low relevance), and the like.

The relevance scores generated by the first model 106 may be input to a parameter filter 126. The parameter filter 126 may determine a subset of parameters 128a-n of the plurality of parameters 124a-n based on relevance. The subset of parameters 128a-n may comprise fewer parameters than the plurality of parameters 124a-n, such that certain parameters from the plurality of parameters 124a-n are filtered out and not included in the subset of parameters 128a-n. The subset of parameters 128a-n may comprise parameters having a relevance score satisfying a threshold. For example, the threshold may be a minimum relevance score at or above which a parameter is included in the subset of parameters 128a-n for being deemed relevant enough to generating the first similarity score to be included in the subset of parameters 128a-n. In some non-limiting embodiments or aspects, the subset of parameters 128a-n may comprise a predetermined number or percent of the plurality of parameters 124a-n, such as the most relevant 10, 20, 50, or 100 parameters, or the top 10%, 20%, or 50% most relevant parameters.

The subset of parameters 128a-n determined by the parameter filter 126 may be stored in a parameter data database 116 (see also, FIG. 2).

Figure 5:
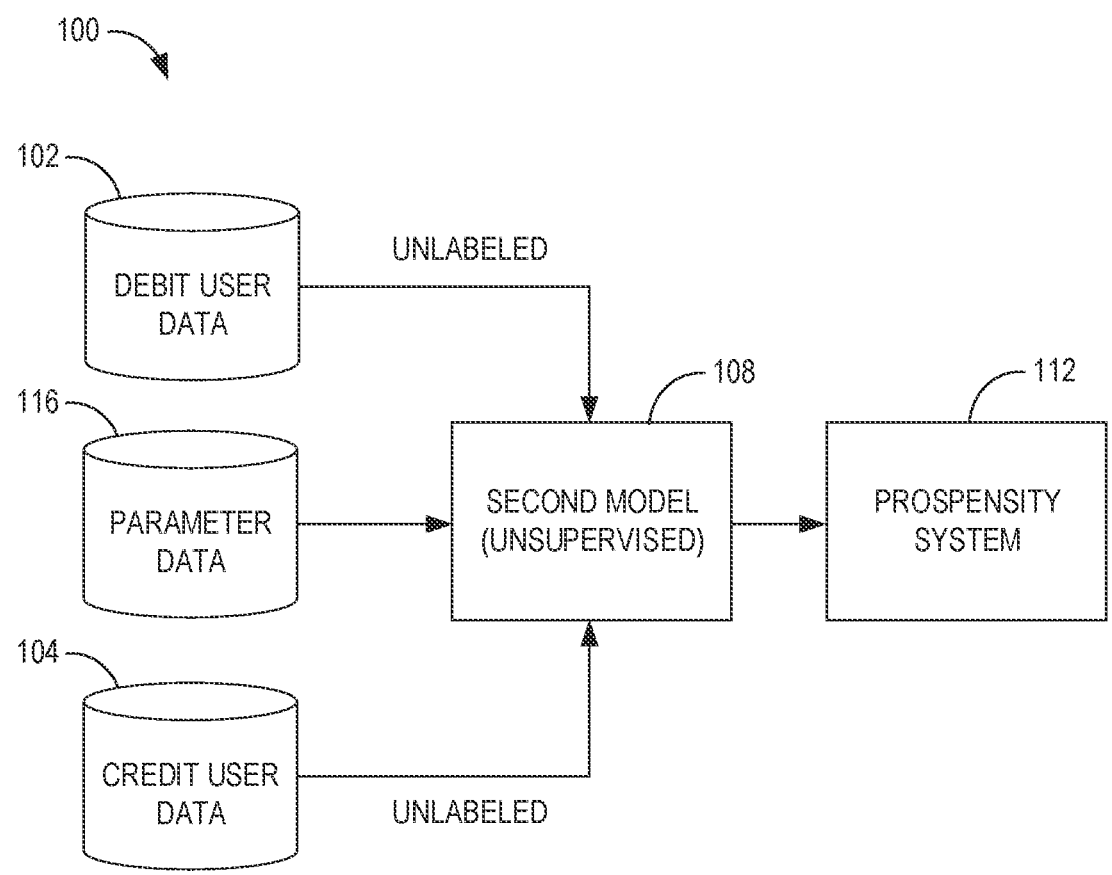
FIG. 5 is a schematic diagram of a system for identifying propensities using a second (unsupervised) machine-learning model, according to some non-limiting embodiments or aspects.

Referring to FIG. 5, the system 100 is shown for identifying propensities using the second model 108 according to some non-limiting embodiments or aspects. Data from the parameter data database 116 may be input to the second model 108. For example, the subset of parameters 128a-n (from FIG. 4) may be input to the second model 108.

A set of data from the debit user data database 102 may be input to the second model 108, the set of data containing data associated with electronic payment transactions conducted by debit card users. In some non-limiting embodiments or aspects, the set of data from the debit user data database 102 input to the second model may contain only the subset of parameters 128a-n associated with the electronic payment transactions and not contain the parameters filtered out by the parameter filter 126. In some non-limiting embodiments or aspects, the set of data from the debit user data database 102 input to the second model may contain the plurality of parameters 124a-n associated with the electronic payment transactions, and the second model 108 may remove those parameters filtered out by the parameter filter 126, so that only the subset of parameters 128a-n of the input data are analyzed by the second model 108 to generate the output.

A set of data from the credit user data database 104 may be input to the second model 108, the set of data containing data associated with electronic payment transactions conducted by credit card users. In some non-limiting embodiments or aspects, the set of data from the credit user data database 104 input to the second model may contain only the subset of parameters 128a-n associated with the electronic payment transactions and not contain the parameters filtered out by the parameter filter 126. In some non-limiting embodiments or aspects, the set of data from the credit user data database 104 input to the second model may contain the plurality of parameters 124a-n associated with the electronic payment transactions, and the second model 108 may remove those parameters filtered out by the parameter filter 126, so that only the subset of parameters 128a-n of the input data are analyzed by the second model 108 to generate the output.

The input of the subset of parameters 128a-n from the parameter data database 116 and the use of only those parameters by the second model in its analysis of the other input data (e.g., transaction data from the debit user data database 102 and credit user data database 104) may conserve processing resources of the second model 108 since fewer data parameters are included in the analysis. Further, the second model 108 may be an unsupervised machine-learning, and narrowing the parameters using the first model 106 may enable the second model 108 to generate output (e.g., predictions) within the predetermined time period.

Figure 6:
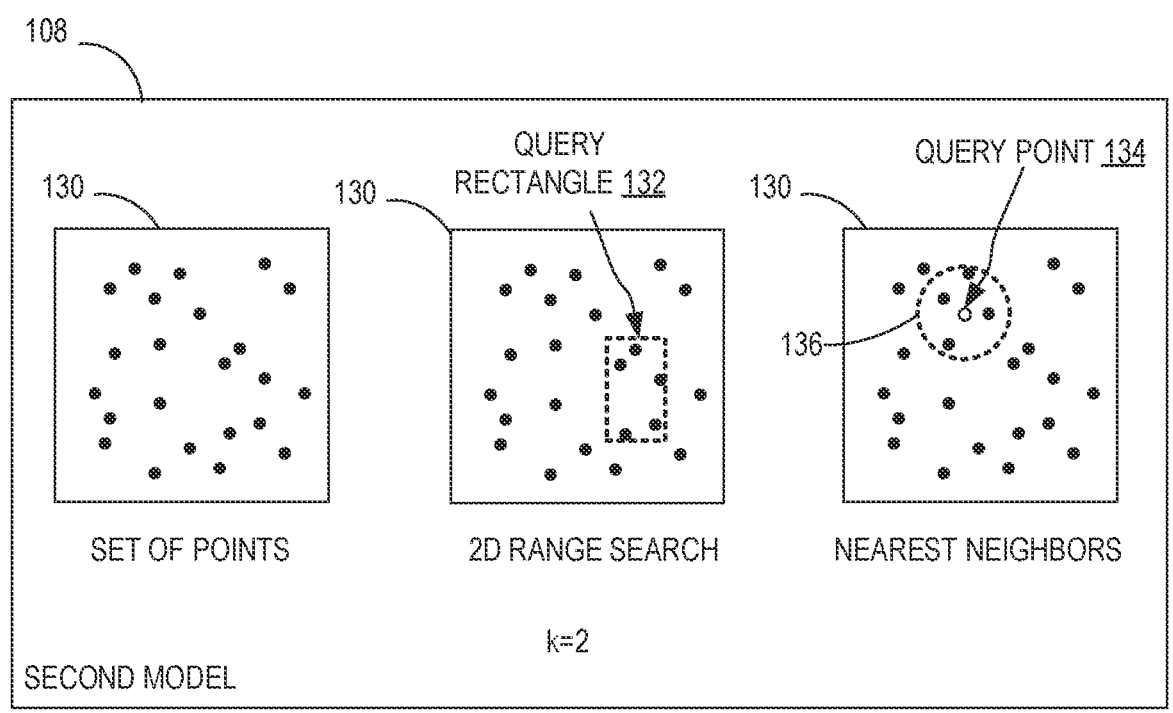
FIG. 6 is a schematic diagram of a second (unsupervised) machine-learning model, according to some non-limiting embodiments or aspects.

With continued reference to FIG. 5 and also referring to FIG. 6, the second model 108 may generate a space-partitioning data structure 130 representing each of the debit card users having data input to the second model 108. For example, the space-partitioning data structure 130 may comprise a set of points, such as a set of nodes arranged in k-dimensional space (e.g., k=2 in FIG. 6, but can be any suitable k-dimensional space) representing debit card users.

For each debit card users having data input to the second model 108, the second model 108 may generate a second similarity score representing the similarity between the particular debit card user and a representation of credit card users. The second similarity score may be based on the space-partitioning data structure 130 and the particular debit card user's arrangement therein relative to credit card users.

Generating the second similarity score representing the similarity between the particular debit card user and a representation of credit card users may be executed in any suitable manner. For example, for each credit card user, the second model 108 may determine at least one feature distance between a representation of the credit card user and a representation of at least one debit card user based on the data associated with the credit and debit card users and the space-partitioning data structure 130. For example, as shown in FIG. 6, a query point 134 may represent the credit card user in the space-partitioning data structure 130. The feature distance may be the distance between the query point 134 and other nodes in the k-dimensional space representing debit card users, such that a plurality of distances are determined between the query point 134 and one or more nearest nodes to the query point 134. The second similarity score may be based on the at least one feature distance.

The space-partitioning data structure 130 may comprise a nearest neighbor range 136 about the query point 134. The nearest neighbor range 136 may be a threshold feature distance (e.g., Euclidean distance) about the query point 134. Nodes representing debit card users within the nearest neighbor range 136 (e.g., within the threshold feature distance) may be identified by the second model 108 as similar to the credit card user represented by the query point 134. For example, in FIG. 6, the credit card user associated with the query point 134 has 4 nearest neighbors (e.g., nodes) based on 4 debit card nodes falling within the nearest neighbor range 136. Based on the foregoing analysis for each credit card user, the number of nearest credit card users neighbors for each debit card user within a nearest neighbor range, within a feature distance therebetween, and the like may be used to generate the second similarity score.

It will be appreciated that in some non-limiting embodiments or aspects, the space partitioning data structure 130 may be generated representing each of the credit card users as nodes, and the query point 134 about which the nearest neighbor range 136 is generated may represent a debit card user.

Generating the second similarity score representing the similarity between the particular debit card user and a representation of credit card users may be executed in any other suitable manner. For example, the second similarity score may be generated using a query rectangle 132 in the space-partitioning data structure 130. A K-D Tree traversal algorithm may be used to determine the nearest neighbor to a query point using a recursive search for a sub-space that potentially contains a neighbor node closer to the current closest neighbor identified. The query rectangle 132 may represent such a sub-space during searching of the k-dimensional space.

The second model 108 generating the second similarity score in this manner may comprise a K-D Tree algorithm. The second model 108 may identify the nearest neighbor(s) based on Euclidean distance and/or a K-D Tree traversal algorithm in k-dimensional space. The K-D Tree algorithm may comprise a binary search tree that organizes points in k-dimensional space. Each node in a K-D Tree may contain one point, and every parent node may divide the space into two sub-spaces based on at least one dimension. The first sub-space may contain points with values satisfying a specific threshold (e.g., less than a specific value), and the second sub-space may contain points with values not satisfying the specific threshold (e.g., greater than the specific value). The K-D Tree algorithm may comprise a binary tree where each node represents an axis-aligned hyperrectangle. For each query point, the traversal algorithm may navigate through the tree to arrive and/or identify in one of the regions using the Euclidean distance.

In some non-limiting embodiments or aspects, the second model 108 may generate the second similarity score and transmit the second similarity score to the propensity system 112. In some non-limiting embodiments or aspects, the output of the second model 108 may be transmitted to the propensity system 112 which may generate the second similarity score.

Figure 7:
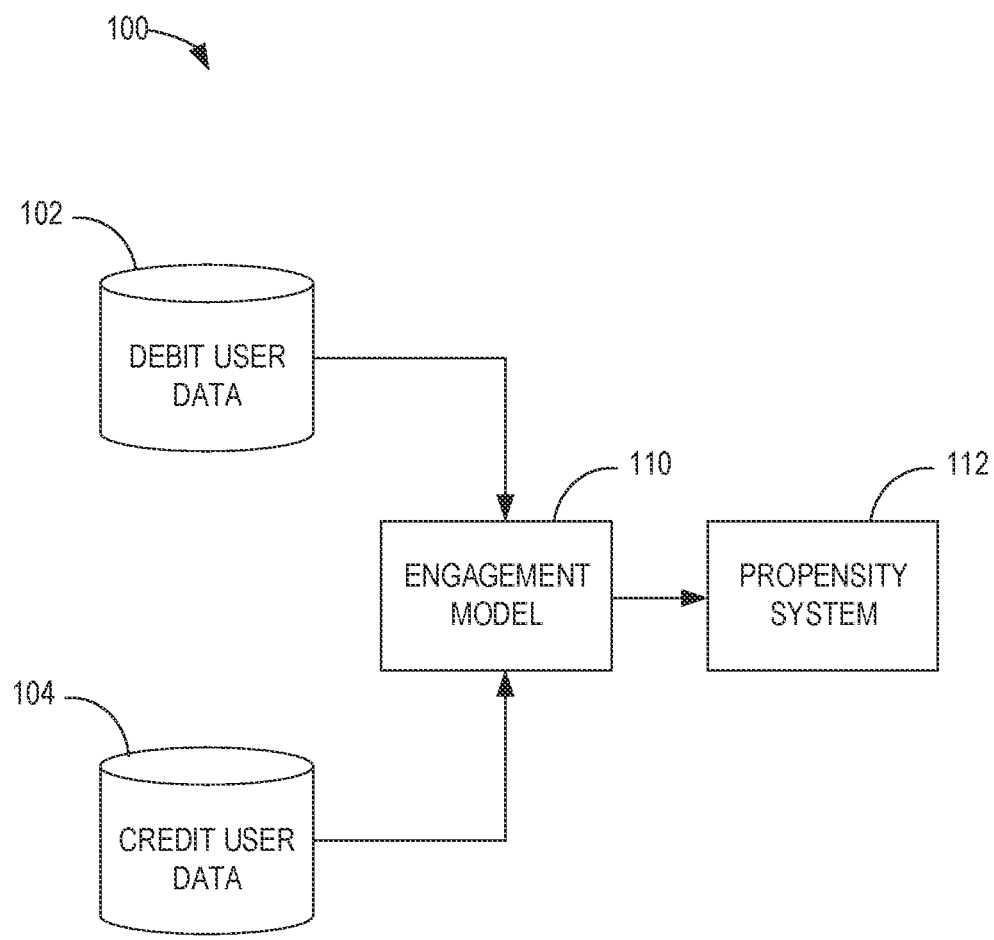
FIG. 7 is a schematic diagram of a system for identifying propensities using an engagement model, according to some non-limiting embodiments or aspects.

Referring to FIG. 7, the system 100 identifying propensities is shown using the engagement model 110. Historical transaction data of the debit card users from the debit user data database 102 may be input to the engagement model 110. Optionally, historical transaction data of the credit card users from the credit user data database 104 may be input to the engagement model 110. In some non-limiting embodiments or aspects, data of the credit card users from the credit user data database 104 may not be input to the engagement model 110, and the engagement model 110 may only analyze the historical transaction data of the debit card users from the debit user data database 102.

For each debit card user, the engagement model 110 may generate an engagement score based on the historical transaction data of the debit card user. For example, the historical transaction data of the debit card user on which the engagement score may be based may include at least one of the following: a user spend value (e.g., amount of spend over a time period, and the like), a user spend frequency (e.g., number of transactions over a time period, and the like), a user spend consistency (e.g., number of months transacted over a time period, and the like), a user spend diversity (e.g., number of unique merchant category code transactions over a time period, and the like), or any combination thereof.

The engagement score may represent the engagement with which the user uses the current debit card(s). The engagement score may be in any suitable form for representing engagement of the user with the debit card, such as a numeric score, an alphabetic grade, a binary return (e.g., engaged, not engaged), a categorization (e.g., high, medium, low engagement), and the like. In some non-limiting embodiments or aspects, the engagement model 110 may generate the engagement score and transmit the engagement score to the propensity system 112. In some non-limiting embodiments or aspects, the output of the engagement model 110 may be transmitted to the propensity system 112 which may generate the engagement score.

Referring again to FIG. 1, the propensity system 112 may generate an overall similarity score for each of the debit card users. The overall similarity score may represent the similarity between the debit card user and a representation of the credit card users. For example, the overall similarity score may be based on the first similarity score (generated by the first model 106) and the second similarity score (generated by the second model 108). The propensity system 112 may generate the overall similarity score by combining the first and second similarity scores in any suitable manner, such as an average, a weighted average, or the like. The first and second similarity scores may be combined to generate the overall similarity score in a manner similar to what is described in FIG. 8 (e.g., having a first axis of the first similarity sore and a second axis of the second similarity score and determining the overall similarity segment based on the coordinate in the 2-D matrix corresponding to the first and second similarity scores).

In some non-limiting embodiments or aspects, the overall similarity score may also be based on the engagement score, such that the overall similarity score may be based on the first and second similarity scores and the engagement score. In some non-limiting embodiments or aspects, the overall similarity score may not be based on the engagement score, and the engagement score may be applied to the already generated overall similarity score.

Figure 8:
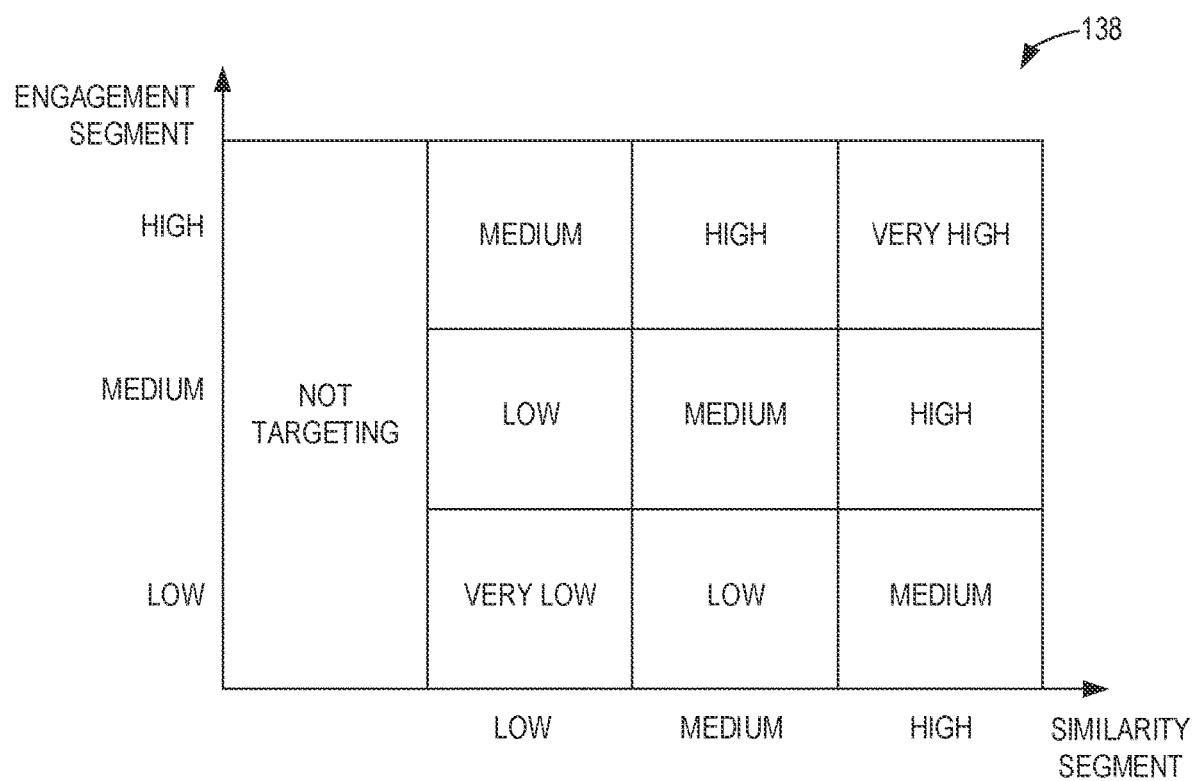

Referring to FIGS. 8 and 9, schematic diagrams are shown for cross-analyzing similarity and engagement segments, according to some non-limiting embodiments or aspects.

In FIG. 8, a propensity matrix 138 is shown according to some non-limiting embodiments or aspects. The propensity system 112 (see FIG. 1) may generate the propensity matrix 138. The propensity matrix 138 may comprise a first axis that represents the debit card user's position along a similarity segment. The similarity segment may represent the system's determination of the similarity of the debit card user to credit card users (e.g., some representation of credit card users). The similarity segment may be based on the first similarity score and the second similarity score generated by the first model 106 and the second model 108. The similarity segment in the propensity matrix 138 in FIG. 8 includes a low, medium, and a high similarity segment. It will be appreciated that other similarity segments may be used additionally or alternatively, such as a numeric similarity segment, a grade, further categories, and the like.

In FIG. 8, the propensity matrix 138 may comprise a second axis that represents the debit card user's position along an engagement segment. The engagement segment may represent the system's determination of the user's engagement with their debit card. The engagement segment may be based on the engagement score generated by the engagement model 110. The engagement segment in the propensity matrix 138 in FIG. 8 includes a low, medium, and a high engagement segment. It will be appreciated that other engagement segments may be used additionally or alternatively, such as a numeric engagement segment, a grade, further categories, and the like.

With continued reference to FIG. 8, the overall similarity score may be generated using the propensity matrix 138 based on both the engagement segment and the similarity segment. The propensity matrix 138 in FIG. 8 contains a plurality of categories (e.g., "very low", "low", "medium", "high", "very high") representing the cross-analysis of the engagement and similarity segments. It will be appreciated that the result of the cross-analysis may additionally or alternatively be generated as a numeric overall similarity score, a grade, further categories, and the like. Moreover, the engagement segment and similarity segment may be combined in any other suitable manner.

In FIG. 9, a propensity table 140 is shown for according to some non-limiting embodiments or aspects. The propensity system 112 (see FIG. 1) may generate propensity table 140. The propensity table 140 may comprise a first segment that represents the debit card user's score associated with similarity segment. The similarity segment may represent the system's determination of the similarity of the debit card user to credit card users (e.g., some representation of credit card users). The similarity segment may be based on the first similarity score and the second similarity score generated by the first model 106 and the second model 108. The similarity segment in the propensity table 140 in FIG. 8 includes both a numeric similarity score and a similarity segment category based on the score. It will be appreciated that other scoring for the similarity segment may be used.

In FIG. 9, the propensity table 140 may comprise a second segment that represents the debit card user's position along an engagement segment. The engagement segment may represent the system's determination of the user's engagement with their debit card. The engagement segment may be based on the engagement score generated by the engagement model 110. The engagement segment in the propensity table 140 in FIG. 8 includes both a numeric engagement score and an engagement segment category based on the score. It will be appreciated that other scoring for the engagement segment may be used.

With continued reference to FIG. 9, a target priority may be generated using the propensity table 140 based on both the engagement segment and the similarity segment. The propensity table 140 in FIG. 9 may contain a target priority score based on the cross-analysis. The target priority may include plurality of categories (e.g., "very low", "low", "medium", "high", "very high"). It will be appreciated that target priority may be additionally or alternatively generated as a numeric score, a grade, further categories, and the like. Moreover, the engagement segment and similarity segment may be combined to generate the target priority in any other suitable manner.

Figure 10:
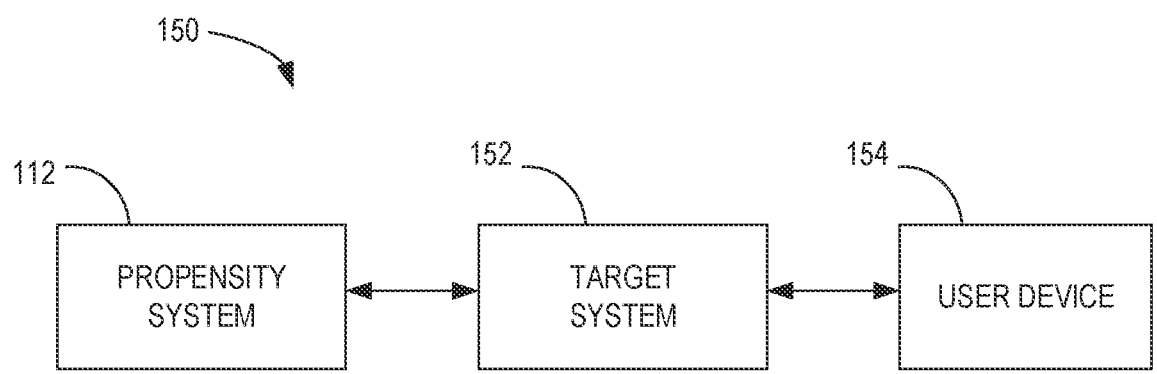
FIG. 10 is a schematic diagram of a system for targeting users, according to some non-limiting embodiments or aspects.

Referring to FIG. 10, a system 150 is shown for targeting users, according to some non-limiting embodiments or aspects. In the system 150, the propensity system may be in communication with a target system 152 and a user device 154. The user device 154 may be a computing device corresponding to a debit card user. Based on output from the propensity system 112, the target system 152 may determine a group of debit card users based on the overall similarity score of each user in the group satisfying a threshold. The overall similarity score may represent the system's determination of the propensity of the particular debit card user for becoming a credit card user in the future. Thus, the group of debit card users determined by the target system 152 may comprise the debit card users satisfying the threshold overall similarity score indicating a propensity for becoming a credit card user. The group determined by the target system 152 may not comprise those debit card users having an overall similarity score not satisfying the threshold.

In response to determining the group, the target system 152 may automatically generate and transmit at least one offer message to each user device 154 corresponding to a debit card user in the group. The offer message may be configured to cause an offer for a credit card to be displayed on a graphical user interface (GUI) of the user device 154. The GUI may comprise one or more selectable elements that enables the debit card user to accept or decline the credit card offer. In response to engagement of the user with a selectable element, a response message may be generated and transmitted by the user device 154 to the target system 152, the response message containing an indicator indicating whether the offer was accepted or declined. In response to an acceptance indicator being contained in the response message, the target system 152 may automatically initiate the opening of a credit account for the debit card user.

In some non-limiting embodiments or aspects, the target system 152 is a component of an issuer system that issues payment accounts and/or payment devices to users. In some non-limiting embodiments or aspects, the target system 152 is a component of a transaction processing system.

With continued reference to FIG. 10, in some non-limiting embodiments or aspects, determining the group may comprise determining the group of debit card users having an overall similarity score satisfying the threshold. The overall similarity score may be based on the first and second similarity scores and the engagement score, which engagement score was generated for each of the debit card users. The group may contain debit card users that have the overall similarity score satisfying the threshold and not contain debit card users that have the overall similarity score not satisfying the threshold. This group may indicate debit card users that have at least threshold similarity to credit card users and at least threshold engagement with their debit card. The target system 152 may automatically transmit the offer message (e.g., with the target system 152) to the user devices 154 corresponding to the debit card users in the group.

With continued reference to FIG. 10, in some non-limiting embodiments or aspects, determining the group may comprise determining the group of debit card users having an overall similarity score satisfying the threshold. The overall similarity score may be based on the first and second similarity scores but not the engagement score. The engagement score may be generated (as previously described) for each user having the overall similarity score satisfying the threshold. For example, engagement scores may be generated only for debit card users having overall similarity scores satisfying the threshold and not for debit card users having overall similarity scores not satisfying the threshold. A second group may be determined of debit card users that have the overall similarity score satisfying the threshold and the engagement score satisfying a second threshold. This second group may indicate debit card users that have an at least threshold similarity to credit card users and an at least threshold engagement with their debit card. The target system 152 may automatically transmit the offer message (e.g., with the target system 152) to the user devices 154 corresponding to the debit card users in the second group.

Figure 11:
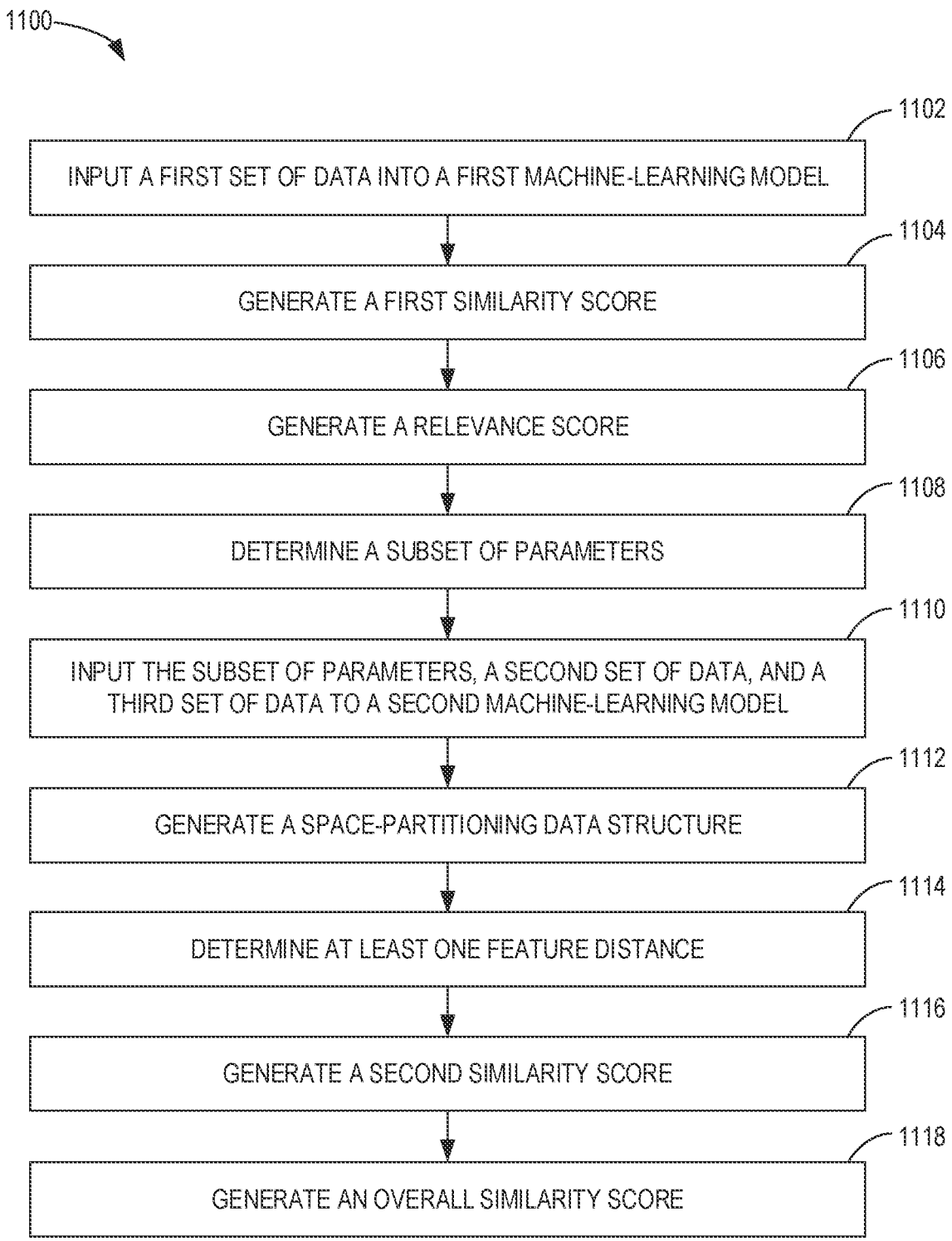
FIG. 11 is a flow diagram of a method for identifying propensities using machine-learning models, according to some non-limiting embodiments or aspects.

Referring now to FIG. 11, shown is a flow diagram of a method 1100 for identifying propensities using machine-learning models, according to some non-limiting embodiments or aspects. The steps shown in FIG. 11 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step.

With continued reference to FIG. 11, the method 1100 may include a step 1102 including inputting, with at least one processor, a first set of data into a first machine-learning model (e.g., first model 106). The first set of data may include first segment data associated with users of a first group (e.g., credit card users), the first segment data labeled with a first identifier of the first group, and second segment data associated with users of a second group (e.g., debit card users), the second segment data labeled with a second identifier of the second group. The first segment data and the second segment data may include a plurality of parameters.

The method 1100 may include a step 1104 including, for each user in the second group, generating, with at least one processor and based on the first machine-learning model, a first similarity score based on a similarity between the user in the second group and a representation of users in the first group based on the first segment data and the second segment data. The first similarity score may be generated by the first model 106 and/or the propensity system 112.

The method 1100 may include a step 1106 including generating, with at least one processor and based on the first machine-learning model, a relevance score for each parameter of the plurality of parameters based on the first segment data and the second segment data. The relevance score may be generated by the first model 106. The method 1100 may include a step 1108 including determining, with at least one processor and based on the first machine-learning model, a subset of the plurality of parameters based on relevance to generating the first similarity scores. The subset of the plurality of parameters may be determined by the first model 106.

With continued reference to FIG. 11, the method 1100 may include a step 1110 including inputting, with at least one processor, the subset of the plurality of parameters, a second set of data, and a third set of data into a second machine-learning model (e.g., second model 108). The second set of data may include the subset of the plurality of parameters for the users of the second group, and the third set of data may include the subset of the plurality of parameters for the users of the first group.

The method 1100 may include a step 1112 including generating, with at least one processor and based on the second machine-learning model, a space-partitioning data structure representing each of the users of the second group based on the second set of data. The second model 108 may generate the space-partitioning data structure.

The method 1100 may include a step 1114 including for each user in the first group, determining, with at least one processor, at least one feature distance between a representation of the user in the first group and a representation of at least one user in the second group based on the third set of data and the space-partitioning data structure. The second model 108 may determine the at least one feature distance.

With continued reference to FIG. 11, the method 1100 may include a step 1116 including, for each user in the second group, generating, with at least one processor and based on the second machine-learning model, a second similarity score representing the similarity between the user in the second group and a representation of users in the first group based on the at least one feature distance. The second similarity score may be generated by the second model 108 and/or the propensity system 112.

The method 1100 may include a step 1118 including, for each user in the second group, generating, with at least one processor, an overall similarity score representing the similarity between the user in the second group and a representation of users in the first group based on the first similarity score and the second similarity score. The overall similarity score may be generated by the propensity system 112.

Figure 12:
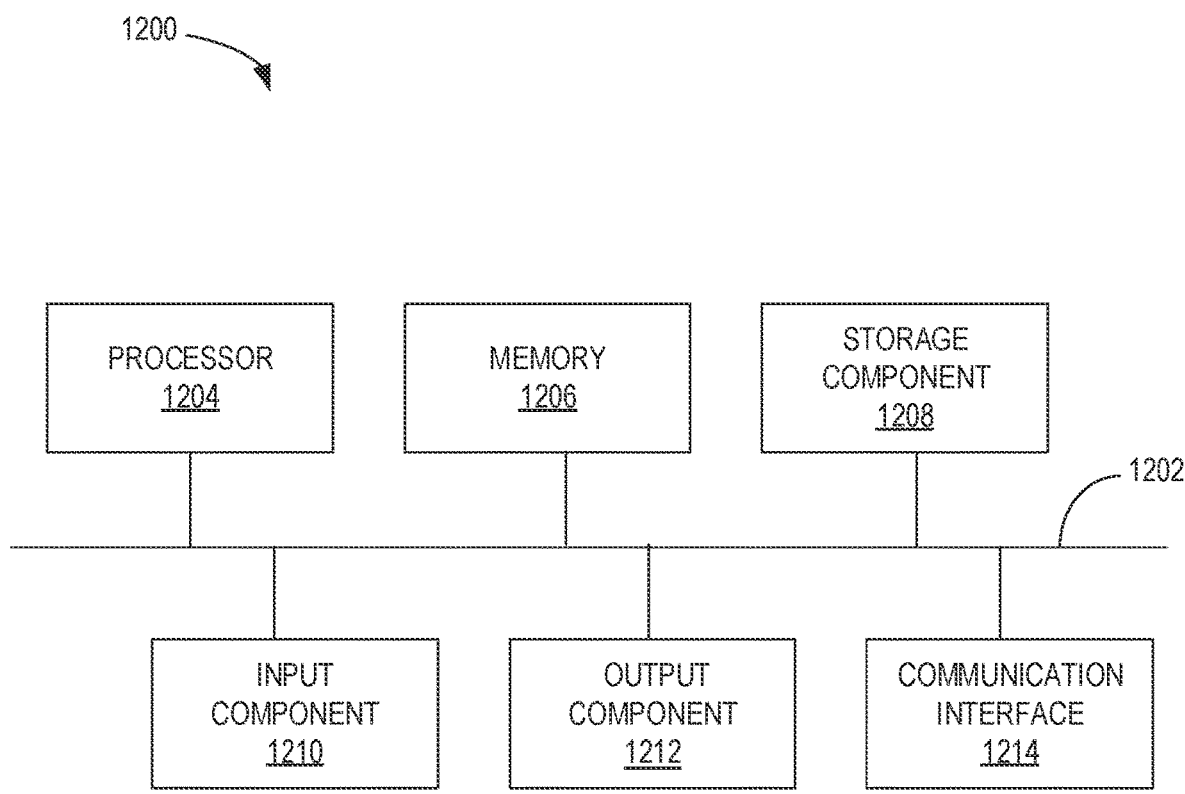
FIG. 12 is a schematic diagram of example components of one or more devices of FIGS. 1-7 and 10, according to some non-limiting embodiments or aspects.

Referring now to FIG. 12, shown is a diagram of example components of a device 1200 according to non-limiting embodiments. Device 1200 may correspond to debit user data database 102, credit user data database 104, first model 106, second model 108, engagement model 110, propensity system 112, labeled data database 114, parameter data database 116, all data database 118, subset database 120a-c, parameter filter 126, target system 152, and/or user device 154 as an example. In some non-limiting embodiments, such systems or devices may include at least one device 1200 and/or at least one component of device 1200. The number and arrangement of components shown are provided as an example. In some non-limiting embodiments, device 1200 may include additional components, fewer components, different components, or differently arranged components than those shown. Additionally, or alternatively, a set of components (e.g., one or more components) of device 1200 may perform one or more functions described as being performed by another set of components of device 1200.

As shown in FIG. 12, device 1200 may include a bus 1202, a processor 1204, memory 1206, a storage component 1208, an input component 1210, an output component 1212, and a communication interface 1214. Bus 1202 may include a component that permits communication among the components of device 1200. In some non-limiting embodiments, processor 1204 may be implemented in hardware, firmware, or a combination of hardware and software. For example, processor 1204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 1206 may include random access memory (RAM), read only memory (ROM), and/or another type of dynamic or static storage device (e.g., flash memory, magnetic memory, optical memory, etc.) that stores information and/or instructions for use by processor 1204.

With continued reference to FIG. 12, storage component 1208 may store information and/or software related to the operation and use of device 1200. For example, storage component 1208 may include a hard disk (e.g., a magnetic disk, an optical disk, a magneto-optic disk, a solid-state disk, etc.) and/or another type of computer-readable medium. Input component 1210 may include a component that permits device 1200 to receive information, such as via user input (e.g., a touch screen display, a keyboard, a keypad, a mouse, a button, a switch, a microphone, etc.). Additionally, or alternatively, input component 1210 may include a sensor for sensing information (e.g., a global positioning system (GPS) component, an accelerometer, a gyroscope, an actuator, etc.). Output component 1212 may include a component that provides output information from device 1200 (e.g., a display, a speaker, one or more light-emitting diodes (LEDs), etc.). Communication interface 1214 may include a transceiver-like component (e.g., a transceiver, a separate receiver and transmitter, etc.) that enables device 1200 to communicate with other devices, such as via a wired connection, a wireless connection, or a combination of wired and wireless connections. Communication interface 1214 may permit device 1200 to receive information from another device and/or provide information to another device. For example, communication interface 1214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 1200 may perform one or more processes described herein. Device 1200 may perform these processes based on processor 1204 executing software instructions stored by a computer-readable medium, such as memory 1206 and/or storage component 1208. A computer-readable medium may include any non-transitory memory device. A memory device includes memory space located inside of a single physical storage device or memory space spread across multiple physical storage devices. Software instructions may be read into memory 1206 and/or storage component 1208 from another computer-readable medium or from another device via communication interface 1214. When executed, software instructions stored in memory 1206 and/or storage component 1208 may cause processor 1204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method, comprising:
  inputting, with at least one processor, a first set of data into a first machine-learning model, the first set of data comprising first segment data associated with users of a first group, the first segment data labeled with a first identifier of the first group, and second segment data associated with users of a second group, the second segment data labeled with a second identifier of the second group, the first segment data and the second segment data comprising a plurality of parameters;
  for each user in the second group, generating, with at least one processor and based on the first machine-learning model, a first similarity score based on a similarity between the user in the second group and a representation of users in the first group based on the first segment data and the second segment data;
  generating, with at least one processor and based on the first machine-learning model, a relevance score for each parameter of the plurality of parameters based on the first segment data and the second segment data;

determining, with at least one processor and based on the first machine-learning model, a subset of the plurality of parameters based on relevance to generating the first similarity scores;

inputting, with at least one processor, the subset of the plurality of parameters, a second set of data, and a third set of data into a second machine-learning model, the second set of data comprising the subset of the plurality of parameters for the users of the second group, the third set of data comprising the subset of the plurality of parameters for the users of the first group;

generating, with at least one processor and based on the second machine-learning model, a space-partitioning data structure representing each of the users of the second group based on the second set of data;

for each user in the first group, determining, with at least one processor, at least one feature distance between a representation of the user in the first group and a representation of at least one user in the second group based on the third set of data and the space-partitioning data structure;

for each user in the second group, generating, with at least one processor and based on the second machine-learning model, a second similarity score representing the similarity between the user in the second group and a representation of users in the first group based on the at least one feature distance; and for each user in the second group, generating, with at least one processor, an overall similarity score representing the similarity between the user in the second group and a representation of users in the first group based on the first similarity score and the second similarity score.

2. The computer-implemented method of claim 1, wherein the users in the first group consist essentially of credit card users, and the users in the second group consist essentially of debit card users.

3. The computer-implemented method of claim 1, wherein the first machine-learning model comprises an XGBoost classifier algorithm, and the second machine-learning model comprises a K-D Tree algorithm.

4. The computer-implemented method of claim 1, wherein the first machine-learning model comprises a supervised machine-learning model, and the second machine-learning model comprises an unsupervised machine-learning model.

5. The computer-implemented method of claim 1, wherein generating the first similarity score comprises the first machine-learning model:

inputting a first subset of the first segment of data and second segment of data into a first decision tree of a plurality of decision trees, wherein the first decision tree generates a first prediction;

inputting a second subset of the first segment of data and second segment of data into a second decision tree of the plurality of decision trees, wherein the second decision tree generates a second prediction; and generating the first similarity score based on the first prediction and the second prediction.

6. The computer-implemented method of claim 1, further comprising:

determining, with at least one processor, a group comprising a plurality of users from the second group based on the overall similarity score of each of the users in the group satisfying a threshold; and in response to determining the group, automatically transmitting, with at least one processor, an offer message to a user device associated with each user in the group.

7. The computer-implemented method of claim 1, wherein the first set of data, the second set of data, and the third set of data comprise historical transaction data associated with electronic payment transactions conducted by users in the first and second groups.

8. The computer-implemented method of claim 1, further comprising:

determining, with at least one processor, a group comprising a plurality of users from the second group based on the overall similarity score of each of the users in the group satisfying a threshold;

for each user in the group, generating, with at least one processor, an engagement score based on historical transaction data associated with each user in the group; and automatically transmitting, with at least one processor, an offer message to a user device associated with each user in the group having an engagement score satisfying a threshold.

9. The computer-implemented method of claim 1, further comprising:

for each user in the second group, generating, with at least one processor, an engagement score based on historical transaction data associated with each user in the second group, wherein the overall similarity score for each user in the second group is generated based on the engagement score; the computer-implemented method further comprising:

determining, with at least one processor, a group comprising a plurality of users from the second group based on the overall similarity score of each of the users in the group satisfying a threshold; and in response to determining the group, automatically transmitting, with at least one processor, an offer message to a user device associated with each user in the group.

10. The computer-implemented method of claim 9, wherein the historical transaction data associated with each user in the second group comprises at least one of the following: a user spend value, a user spend frequency, a user spend consistency, a user spend diversity, or any combination thereof.

11. A system comprising at least one processor configured to:

input a first set of data into a first machine-learning model, the first set of data comprising first segment data associated with users of a first group, the first segment data labeled with a first identifier of the first group, and second segment data associated with users of a second group, the second segment data labeled with a second identifier of the second group, the first segment data and the second segment data comprising a plurality of parameters;

for each user in the second group, generate, based on the first machine-learning model, a first similarity score based on a similarity between the user in the second group and a representation of users in the first group based on the first segment data and the second segment data;

generate, based on the first machine-learning model, a relevance score for each parameter of the plurality of parameters based on the first segment data and the second segment data;

determine, based on the first machine-learning model, a subset of the plurality of parameters based on relevance to generating the first similarity scores;

input the subset of the plurality of parameters, a second set of data, and a third set of data into a second machine-learning model, the second set of data comprising the subset of the plurality of parameters for the users of the second group, the third set of data comprising the subset of the plurality of parameters for the users of the first group;

generate, based on the second machine-learning model, a space-partitioning data structure representing each of the users of the second group based on the second set of data;

for each user in the first group, determine at least one feature distance between a representation of the user in the first group and a representation of at least one user in the second group based on the third set of data and the space-partitioning data structure;

for each user in the second group, generate, based on the second machine-learning model, a second similarity score representing the similarity between the user in the second group and a representation of users in the first group based on the at least one feature distance; and for each user in the second group, generate an overall similarity score representing the similarity between the user in the second group and a representation of users in the first group based on the first similarity score and the second similarity score.

12. The system of claim 11, wherein the users in the first group consist essentially of credit card users, and the users in the second group consist essentially of debit card users.

13. The system of claim 11, wherein the first machine-learning model comprises an XGBoost classifier algorithm, and the second machine-learning model comprises a K-D Tree algorithm.

14. The system of claim 11, wherein the first machine-learning model comprises a supervised machine-learning model, and the second machine-learning model comprises an unsupervised machine-learning model.

15. The system of claim 11, wherein generating the first similarity score comprises the first machine-learning model:
inputting a first subset of the first segment of data and second segment of data into a first decision tree of a plurality of decision trees, wherein the first decision tree generates a first prediction;
inputting a second subset of the first segment of data and second segment of data into a second decision tree of the plurality of decision trees, wherein the second decision tree generates a second prediction; and
generating the first similarity score based on the first prediction and the second prediction.

16. The system of claim 11, the at least one processor configured to:
determine a group comprising a plurality of users from the second group based on the overall similarity score of each of the users in the group satisfying a threshold; and
in response to determining the group, automatically transmit an offer message to a user device associated with each user in the group.

17. The system of claim 11, wherein the first set of data, the second set of data, and the third set of data comprise historical transaction data associated with electronic payment transactions conducted by users in the first and second groups.

18. The system of claim 11, the at least one processor configured to:

determine a group comprising a plurality of users from the second group based on the overall similarity score of each of the users in the group satisfying a threshold;
for each user in the group, generate an engagement score based on historical transaction data associated with each user in the group; and
automatically transmit an offer message to a user device associated with each user in the group having an engagement score satisfying a threshold.

19. The system of claim 11, the at least one processor configured to:
for each user in the second group, generate an engagement score based on historical transaction data associated with each user in the second group,
wherein the overall similarity score for each user in the second group is generated based on the engagement score; the at least one processor further configured to:
determine a group comprising a plurality of users from the second group based on the overall similarity score of each of the users in the group satisfying a threshold; and
in response to determining the group, automatically transmit an offer message to a user device associated with each user in the group.

20. A computer program product, comprising at least one non-transitory computer-readable medium including program instructions that, when executed by at least one processor, cause the at least one processor to:
input a first set of data into a first machine-learning model, the first set of data comprising first segment data associated with users of a first group, the first segment data labeled with a first identifier of the first group, and second segment data associated with users of a second group, the second segment data labeled with a second identifier of the second group, the first segment data and the second segment data comprising a plurality of parameters;
for each user in the second group, generate, based on the first machine-learning model, a first similarity score based on a similarity between the user in the second group and a representation of users in the first group based on the first segment data and the second segment data;
generate, based on the first machine-learning model, a relevance score for each parameter of the plurality of parameters based on the first segment data and the second segment data;
determine, based on the first machine-learning model, a subset of the plurality of parameters based on relevance to generating the first similarity scores;
input the subset of the plurality of parameters, a second set of data, and a third set of data into a second machine-learning model, the second set of data comprising the subset of the plurality of parameters for the users of the second group, the third set of data comprising the subset of the plurality of parameters for the users of the first group;
generate, based on the second machine-learning model, a space-partitioning data structure representing each of the users of the second group based on the second set of data;
for each user in the first group, determine at least one feature distance between a representation of the user in the first group and a representation of at least one user in the second group based on the third set of data and the space-partitioning data structure;

for each user in the second group, generate, based on the second machine-learning model, a second similarity score representing the similarity between the user in the second group and a representation of users in the first group based on the at least one feature distance; and for each user in the second group, generate an overall similarity score representing the similarity between the user in the second group and a representation of users in the first group based on the first similarity score and the second similarity score.

* * * * *